United States Patent
Ford et al.

(10) Patent No.: US 10,318,729 B2
(45) Date of Patent: Jun. 11, 2019

(54) PRIVACY PROTECTION DURING INSIDER THREAT MONITORING

(71) Applicant: Forcepoint, LLC, Austin, TX (US)

(72) Inventors: Richard A. Ford, Austin, TX (US); Christopher B. Shirey, Leander, TX (US); Jonathan B. Knepher, La Mesa, CA (US); Lidror Troyansky, Givataim (IL)

(73) Assignee: Forcepoint, LLC, Austin, TX (US)

( * ) Notice: Subject to any disclaimer, the term of this patent is extended or adjusted under 35 U.S.C. 154(b) by 199 days.

(21) Appl. No.: 15/667,054

(22) Filed: Aug. 2, 2017

(65) Prior Publication Data

US 2019/0034660 A1  Jan. 31, 2019

Related U.S. Application Data

(60) Provisional application No. 62/537,102, filed on Jul. 26, 2017.

(51) Int. Cl.
*G06F 21/55* (2013.01)
*G06F 21/62* (2013.01)
(Continued)

(52) U.S. Cl.
CPC ........ *G06F 21/552* (2013.01); *G06F 11/3438* (2013.01); *G06F 21/577* (2013.01); *G06F 21/602* (2013.01); *G06F 21/6245* (2013.01); *G06F 21/6254* (2013.01); *G06F 21/84* (2013.01); *H04L 63/1408* (2013.01);
(Continued)

(58) Field of Classification Search
CPC .............. G06F 21/552; G06F 21/6245; G06F 21/6254; G06F 21/84; G06F 21/602; G06F 11/3438; G06F 21/577; G06F 2221/032; G06F 2221/031; H04L 67/306; H04L 63/1441; H04L 63/1433; H04L 63/1425; H04L 67/146; H04L 63/20; H04L 67/141;
(Continued)

(56) References Cited

U.S. PATENT DOCUMENTS 7,571,176 B2    8/2009  Shapiro
7,802,305 B1 *  9/2010  Leeds ................. G06F 17/2735
                                                              726/26
(Continued)

OTHER PUBLICATIONS google.com, Phishing Prevention with Password Alert FAQ, printed Feb. 22, 2018.

*Primary Examiner* — Darren B Schwartz
(74) *Attorney, Agent, or Firm* — Terrile, Cannatti & Chambers; Stephen A. Terrile

(57) ABSTRACT

A method, system and computer-usable medium are disclosed for performing a privacy operation, comprising: monitoring user behavior via a data stream collector, the data stream collector capturing data streams resulting from user/device interactions between a user and a corresponding endpoint device; determining whether the data streams resulting from user/device interactions include sensitive personal information; obfuscating the sensitive personal information, the obfuscating preventing unauthorized viewing of the sensitive personal information; and, presenting the sensitive personal information as a sensitive personal information token indicating the data streams include sensitive personal information.

17 Claims, 17 Drawing Sheets

(51) Int. Cl.
  *G06F 21/84* (2013.01)
  *G06F 21/60* (2013.01)
  *H04L 29/08* (2006.01)
  *H04L 29/06* (2006.01)
  *G06F 11/34* (2006.01)
  *G06F 21/57* (2013.01)

(52) U.S. Cl.
  CPC ...... *H04L 63/1425* (2013.01); *H04L 63/1433* (2013.01); *H04L 63/1441* (2013.01); *H04L 63/20* (2013.01); *H04L 67/025* (2013.01); *H04L 67/141* (2013.01); *H04L 67/146* (2013.01); *H04L 67/22* (2013.01); *H04L 67/306* (2013.01); *G06F 2221/031* (2013.01); *G06F 2221/032* (2013.01); *H04L 2209/16* (2013.01)

(58) Field of Classification Search
  CPC ... H04L 67/025; H04L 63/1408; H04L 67/22; H04L 2209/16
  See application file for complete search history.

(56) References Cited

U.S. PATENT DOCUMENTS

| | | |
|---|---|---|
| 8,122,122 B1 | 2/2012 | Clingenpeel et al. |
| 8,613,108 B1 | 12/2013 | Aggarwal |
| 8,640,231 B2 | 1/2014 | Florencio et al. |
| 9,130,986 B2 | 9/2015 | Troyansky |
| 9,246,944 B1 | 1/2016 | Chen |
| 9,268,947 B1 | 2/2016 | Jarlstrom et al. |
| 10,025,952 B1 | 7/2018 | Wang et al. |
| 10,049,227 B1 | 8/2018 | Sampson |
| 2002/0069363 A1 | 6/2002 | Winburn |
| 2004/0078595 A1* | 4/2004 | Kent, Jr. ............... G06Q 10/107 713/160 |
| 2005/0071282 A1 | 3/2005 | Lu et al. |
| 2005/0183143 A1 | 8/2005 | Anderholm et al. |
| 2006/0206487 A1 | 9/2006 | Harada et al. |
| 2006/0224898 A1 | 10/2006 | Ahmed |
| 2006/0259950 A1 | 11/2006 | Mattsson |
| 2007/0039048 A1 | 2/2007 | Shelest et al. |
| 2007/0067853 A1 | 3/2007 | Ramsey |
| 2007/0124601 A1 | 5/2007 | Singh et al. |
| 2007/0242827 A1 | 10/2007 | Prafullchandra et al. |
| 2008/0147554 A1* | 6/2008 | Stevens ............... G06F 21/6254 705/51 |
| 2008/0204788 A1* | 8/2008 | Kelly ..................... G06T 11/60 358/1.15 |
| 2008/0239365 A1* | 10/2008 | Salgado ................ G06F 17/212 358/1.15 |
| 2009/0144619 A1* | 6/2009 | Best .................... G06F 21/6245 715/277 |
| 2009/0158441 A1 | 6/2009 | Mohler et al. |
| 2009/0164878 A1* | 6/2009 | Cottrille .............. G06F 21/6245 715/210 |
| 2009/0276623 A1 | 11/2009 | Jevans et al. |
| 2010/0014676 A1 | 1/2010 | McCarthy et al. |
| 2010/0169971 A1 | 7/2010 | Raviv |
| 2010/0205667 A1 | 8/2010 | Anderson et al. |
| 2011/0099602 A1 | 4/2011 | Apparao et al. |
| 2011/0239113 A1* | 9/2011 | Hung .................... G16H 15/00 715/271 |
| 2012/0028659 A1* | 2/2012 | Whitney ........... H04M 1/72547 455/466 |
| 2012/0137367 A1 | 5/2012 | Dupont et al. |
| 2013/0054976 A1 | 2/2013 | Brown et al. |
| 2013/0091085 A1 | 4/2013 | Sohn et al. |
| 2013/0097701 A1 | 4/2013 | Moyle et al. |
| 2013/0111220 A1 | 5/2013 | Friedlander et al. |
| 2013/0167192 A1* | 6/2013 | Hickman ................ G06F 21/60 726/1 |
| 2013/0167207 A1 | 6/2013 | Davis et al. |
| 2013/0167245 A1* | 6/2013 | Birtwhistle ............ G06Q 10/10 726/26 |
| 2014/0007186 A1* | 1/2014 | Agrawal ................ G06F 21/60 726/1 |
| 2014/0096215 A1 | 4/2014 | Hessler |
| 2014/0189784 A1 | 7/2014 | Marino et al. |
| 2014/0208418 A1* | 7/2014 | Libin .................. G06F 21/6209 726/19 |
| 2014/0289875 A1 | 9/2014 | Knafel |
| 2014/0331279 A1 | 11/2014 | Aissi et al. |
| 2015/0082032 A1 | 3/2015 | Bruce et al. |
| 2015/0172294 A1* | 6/2015 | Bittner .................... G06F 16/00 726/4 |
| 2015/0195300 A1 | 7/2015 | Adjaoute |
| 2015/0271207 A1 | 9/2015 | Jaiswal et al. |
| 2015/0358317 A1 | 12/2015 | Deutschmann et al. |
| 2016/0063269 A1* | 3/2016 | Liden ................... G06F 21/6218 726/26 |
| 2016/0143570 A1 | 5/2016 | Valacich et al. |
| 2016/0147945 A1* | 5/2016 | MacCarthy ......... G06F 21/6254 705/51 |
| 2016/0224800 A1* | 8/2016 | Bellert ................ G06F 21/6245 |
| 2016/0234174 A1 | 8/2016 | Zizi et al. |
| 2016/0239668 A1* | 8/2016 | Bellert .................... G06F 21/10 |
| 2016/0300231 A1* | 10/2016 | Shavell ............... G06Q 20/4016 |
| 2017/0085534 A1* | 3/2017 | Iyer ...................... G06F 16/258 |
| 2017/0161525 A1 | 6/2017 | Vieira et al. |
| 2017/0251007 A1 | 8/2017 | Fujisawa et al. |
| 2017/0272472 A1 | 9/2017 | Adhar |
| 2017/0366348 A1 | 12/2017 | Weimer et al. |
| 2018/0041503 A1 | 2/2018 | Lindemann |
| 2018/0174493 A1 | 6/2018 | Ohori et al. |

* cited by examiner

PRIVACY PROTECTION DURING INSIDER THREAT MONITORING

BACKGROUND OF THE INVENTION

Field of the Invention

The present invention relates in general to the field of computers and similar technologies, and in particular to software utilized in this field. Still more particularly, it relates to a method, system and computer-usable medium for privacy protection during insider threat monitoring.

Description of the Related Art

Users interact with physical, system, data, and services resources of all kinds, as well as each other, on a daily basis. Each of these interactions, whether accidental or intended, poses some degree of security risk. Many physical and cyber security efforts have traditionally been oriented towards preventing or circumventing the intent of external threats. A growing area of physical and cyber security efforts now focuses on identifying and addressing insider threats. It is known to perform a user input/output (I/O) event collection operation when identifying and addressing insider threats. With known I/O collection operations, an I/O event collector collects all keystrokes, user gestures, and physical security interactions (e.g., use of an access card) performed by a user within an organization.

SUMMARY OF THE INVENTION

A method, system and computer-usable medium are disclosed for performing a privacy operation, comprising: monitoring user behavior via an I/O collector, the I/O collector capturing data streams, events and metadata resulting from user/device interactions between a user and a device; determining whether the user/device interactions include sensitive personal information; obfuscating the sensitive personal information, the obfuscating preventing viewing of the sensitive personal information; and, presenting the sensitive personal information as a sensitive personal information indication, the sensitive personal information indication indicating the data streams include sensitive personal information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
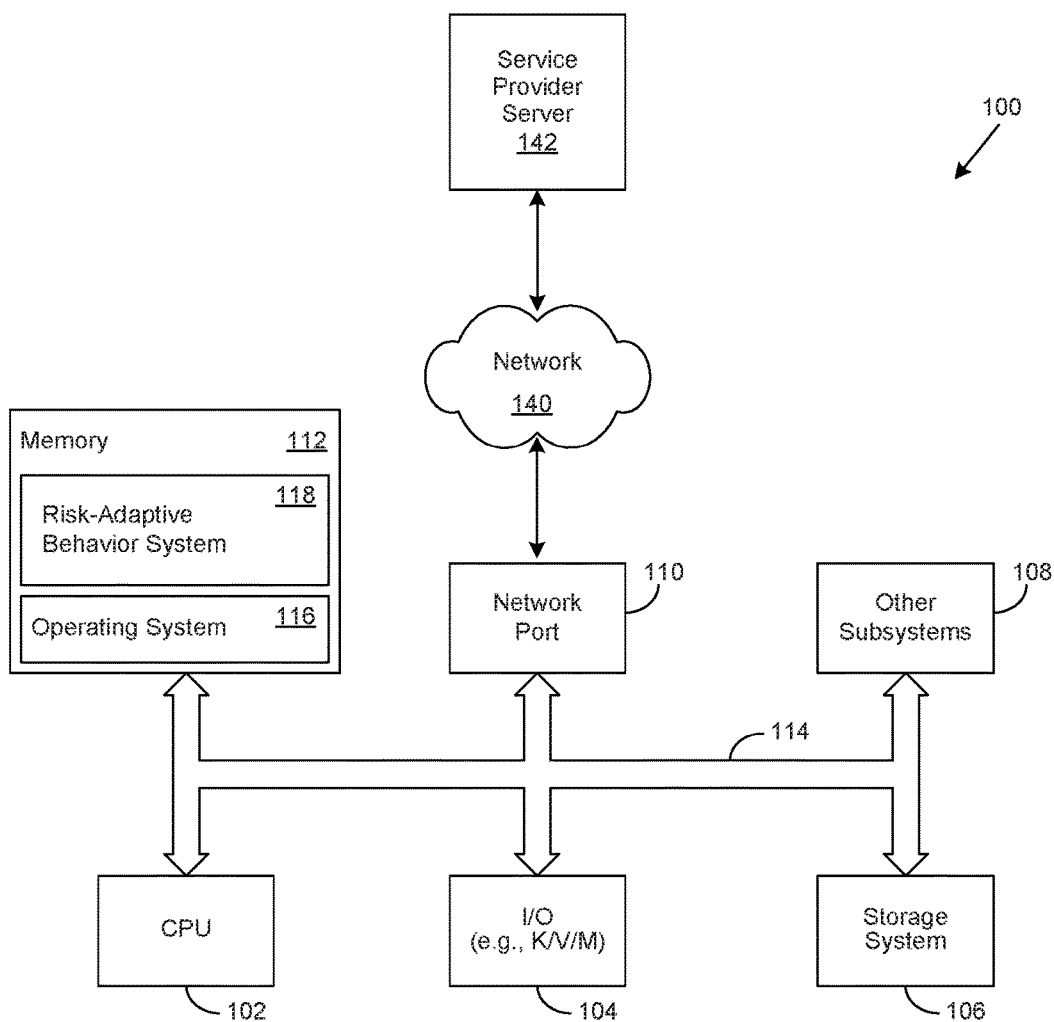
FIG. 1 depicts an exemplary client computer in which the present invention may be implemented.

Certain aspects of the present disclosure include an appreciation that an input/output (I/O) event collection operation can inadvertently capture and disclose a user's password or other personally sensitive information. Certain aspects of the present disclosure include an appreciation that it would be desirable to detect password or security credential reuse across multiple sites, where and how such passwords or security credentials are entered, and associated location information, to provide proactive detection of credential loss, such as via phishing attacks. Certain aspects of the present disclosure include an appreciation that it would be desirable to avoid storing any personally sensitive information obtained during an I/O event collection operation as human-interpretable information.

A method, system and computer-usable medium are disclosed for performing a privacy protection operation during insider threat monitoring. In certain embodiments, the privacy protection operation stores a one-way function (e.g., a hash) rendition of the user's password at login within an endpoint agent. In certain embodiments, the one-way function is an internally complex one-way function such as a multidimensional array of hashes with their state. Such an internally complex one-way function enables a user case with unknown starting and ending points, backspaces and trivial password variants. As the endpoint receives individual I/O events, they are sequentially added to the one-way function such that when the user re-enters sensitive personal information (SPI), such as a user's password, the system recognizes that the sequence of collected I/O events correspond to the SPI and identifies the sequence of collected I/O events as a potential match of the user's credential. When the sequence of collected I/O events has been identified as a potential match to the user's credential, this information can be used in a plurality of use cases.

In certain embodiments, heuristics are implemented to determine whether a sequence of collected I/O events may represent SPI. As an example, a user may enter a series of keystrokes for their password. However, the individual keystrokes may be displayed as asterisks on the user interface (UI) of the user's device. Further, the keystrokes may have been entered within a particular window of the UI associated with user passwords. In this example, the implemented heuristics may indicate a high likelihood that the keystrokes are the user's password, and therefore likely represent SPI.

In various embodiments, the privacy protection operation captures a context in which the entered sequence of collected I/O events has occurred and obfuscates the sequence of collected I/O events corresponding to the SPI such that the sequence of collected I/O events is not displayed to a security administrator, such as an Insider Threat Investigator. Instead, the sequence of collected I/O events is rendered, displayed, or saved as an SPI indication such as a token. Thus, the security administrator can observe that the SPI was entered by a user, but not the actual SPI itself.

In certain embodiments, the privacy protection operation includes a conditional SPI access scenario that allows an investigator to access associated raw events if needed. In certain embodiments, the raw events may include the obfuscated sequence of collected I/O events and a context in which the sequence of collected I/O events were entered. Such a conditional access scenario prevents casual exposure of users' SPI within the insider threat operation. In certain embodiments, such a conditional access scenario likewise adds accountability related to how the users' SPI is accessed, and by whom, within an organization. In certain embodiments, the privacy protection operation captures where the SPI was entered and/or re-used. If the SPI was entered via an information processing system maintained by the information technology environment, the privacy protection system might determine there is no or relatively low risk to the organization from the SPI entry. However, if the SPI was entered and/or reused by a third-party server, then the privacy protection system might determine that there is a strong risk of loss of credentials. Such a privacy protection operation allows users to be alerted, and potentially proactively blocked, when entering their SPI into a non-approved location. Such a privacy protection operation also provides strong protection from phishing, as the phishing endpoint is not approved.

In certain embodiments, the privacy protection operation offers the user an opportunity to enroll their SPI in the privacy protection system. Thus, enrolling the SPI provides the user with an assurance that inadvertent display of the SPI associated with their personal accounts (e.g., Gmail, Yahoo!) in the company security system (such as an Insider Threat System) would be prevented, but does not weaken the protection provided by the company security system. In certain embodiments, the privacy protection operation uses a software guard (SG) enclave (such as the Software Guard Extension available from Intel Corporation) to protect the privacy protection system, and/or developing or leveraging a streaming hash algorithm. In certain embodiments, the one-way function does not need to be cryptographically secure, and collisions of data produced by the one-way function result in a positive, rather than a negative, effect. In various embodiments, the privacy protection operation prevents an attacker from capturing data generated by the use of the one-way function and thereby being able to derive the SPI from that data.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage systems, one or more network ports for communicating externally, as well as various input and output (I/O) devices, such as a keyboard, a mouse, and a graphics display.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include either or both a risk-adaptive behavior system 118 and a privacy protection system 119. In one embodiment, the information handling system 100 is able to download the risk-adaptive behavior system 118 and/or the privacy protection system from the service provider server 142. In another embodiment, the risk-adaptive behavior system 118 and/or the privacy protection system 119 is provided as a service from the service provider server 142.

In various embodiments, the risk-adaptive behavior system 118 performs a risk-adaptive behavior operation to assess the risk corresponding to a user behavior and adaptively responding with an associated response. In certain embodiments, the risk-adaptive behavior operation improves processor efficiency, and thus the efficiency of the information handling system 100, by automatically performing a risk-adaptive behavior operation. As will be appreciated, once the information handling system 100 is configured to perform the risk-adaptive behavior system operation, the information handling system 100 becomes a specialized computing device specifically configured to perform the risk-adaptive behavior operation and is not a general purpose computing device. Moreover, the implementation of the risk-adaptive behavior system 118 on the information handling system 100 improves the functionality of the information handling system 100 and provides a useful and concrete result of automatically assessing the risk corresponding to a user behavior and adaptively responding with an associated response.

In various embodiments, the privacy protection system 119 performs a privacy protection operation. In certain embodiments, the privacy protection operation improves processor efficiency, and thus the efficiency of the information handling system 100, by automatically performing a privacy protection operation. As will be appreciated, once the information handling system 100 is configured to perform the risk-adaptive behavior system operation, the information handling system 100 becomes a specialized computing device specifically configured to perform the privacy protection operation and is not a general purpose computing device. Moreover, the implementation of the privacy protection system 119 on the information handling system 100 improves the functionality of the information handling system 100 and provides a useful and concrete result of automatically protecting sensitive information obtained via a keystroke monitoring operation.

Figure 2:
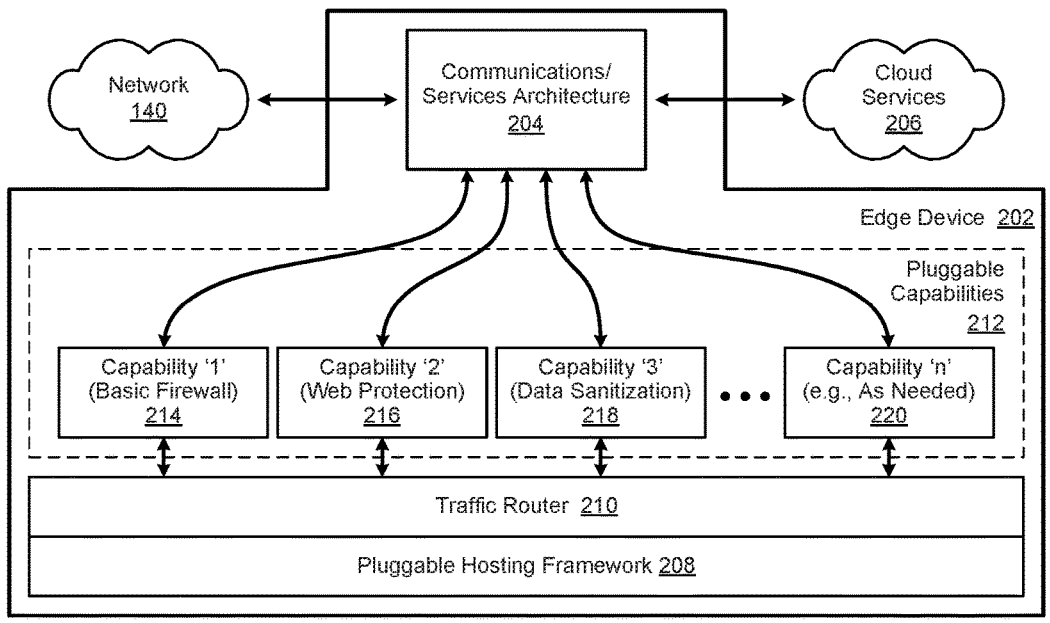
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In various embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed, as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In various embodiments, the edge device 202 is implemented to include a communications/services architecture 202, various pluggable capabilities 212, a traffic router 210, and a pluggable hosting framework 208. In certain of these embodiments, the communications/services architecture 202 may be implemented to provide access to and from various networks 140, cloud services 206, or a combination thereof. In various embodiments, the cloud services 206 may be provided by a cloud infrastructure familiar to those of skill in the art. In various embodiments, the edge device 202 may be implemented to provide support for a variety of generic services, such as directory integration, logging interfaces, update services, and bidirectional risk/context flows associated with various analytics.

In certain embodiments, the edge device 202 is implemented as a generic device configured to host various network communications, data processing, and security management capabilities. In various embodiments, the pluggable hosting framework 208 is implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis.

In various embodiments, the pluggable capabilities 212 are sourced from various cloud services 206. In certain embodiments, the pluggable hosting framework 208 may be implemented to provide certain computing and communication infrastructure components, and foundation capabilities, required by one or more of the pluggable capabilities 212. In various embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
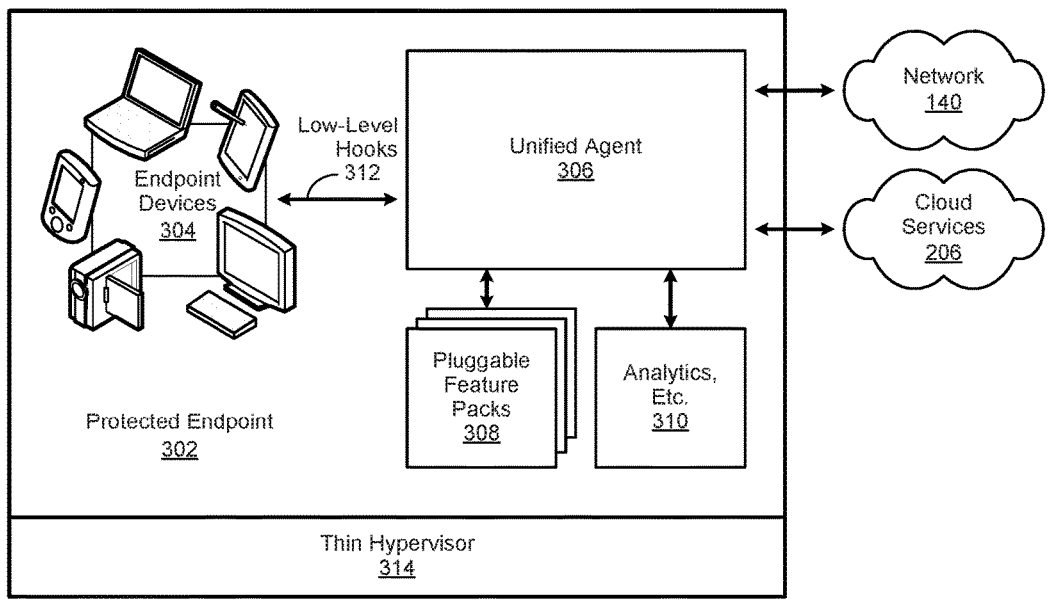
FIG. 3 is a simplified block diagram of a unified agent.

FIG. 3 is a simplified block diagram of a unified agent implemented in accordance with an embodiment of the invention. As used herein, a unified agent, such as the unified agent 306 shown in FIG. 3, broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches, the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In various embodiments, the communication of the data may take place in real-time or near-real-time. As an example, a cellular phone conversation may be used to communicate information in real-time, while an instant message (IM) exchange may be used to communicate information in near-real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In various embodiments, the protected endpoint 302 is implemented to perform risk-adaptive behavior operations.

Risk-adaptive behavior, as used herein, broadly refers to adaptively responding to a risk associated with an electronically-observable user behavior. As used herein, electronically-observable user behavior broadly refers to any behavior exhibited or enacted by a user that can be electronically observed. In various embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system. In this example, the individual actions performed by the user to download the data file constitute a cyber behavior. In these examples, the actions are enacted within cyberspace, which makes them electronically-observable.

As likewise used herein, cyberspace broadly refers to a network 140 environment capable of supporting communication between two or more entities. In various embodiments, the entity may be a user, an endpoint device 304, or various resources, described in greater detail herein. In certain embodiments, the entities may include various endpoint devices 304 or resources operating at the behest of an entity, such as a user. In various embodiments, the communication between the entities may include audio, image, video, text, or binary data.

By extension, a risk-adaptive behavior system, as used herein, broadly refers to a system implemented to monitor various user behaviors, assess the corresponding risk they may represent, individually or in combination, and respond with an associated response. In certain embodiments, such responses may be based upon contextual information associated with a given user behavior. As used herein, contextual information broadly refers to any information, directly or indirectly, individually or in combination, related to a particular user behavior. As described in greater detail herein, the contextual information may include a user's identification factors, their authentication factors, their role in an organization, and their associated access rights. Other contextual information may likewise include various user interactions, whether the interactions are with an endpoint device 304, a network 140, a resource, or another user. Contextual information may likewise include the date/time/frequency of various user behaviors, the user's location, and certain user gestures employed by the user in the enactment of a user behavior. In various embodiments, user behaviors, and their related contextual information, may be collected at particular points of observation, described in greater detail herein.

In various embodiments, the unified agent 306 is implemented to universally support a variety of operating systems, such as Apple macOS®, Microsoft Windows®, Linux®, and so forth. In certain embodiments, the unified agent 306 interacts with the endpoint device 304 through the use of low-level hooks 312 at the OS level. It will be appreciated that the use of low-level hooks 312 allows the unified agent 306 to subscribe to multiple events through a single hook. Accordingly, multiple functionalities provided by the unified agent 306 can share a single data stream, using only those portions of the data stream they may individually need. Accordingly, system efficiency can be improved and operational overhead reduced.

In various embodiments, the unified agent 306 provides a common infrastructure for pluggable feature packs 308. In certain of these embodiments, the pluggable feature packs 308 may provide certain security management functionalities. Examples of such functionalities may include various anti-virus and malware detection, data loss protection (DLP), insider threat detection, and so forth. In various embodiments, the security management functionalities may include one or more risk-adaptive behavior functionalities, described in greater detail herein.

In certain embodiments, a particular pluggable feature pack 308 is invoked as needed by the unified agent 306 to provide a given risk-adaptive behavior functionality. In one embodiment, individual features of a particular pluggable feature pack 308 are invoked as needed. It will be appreciated that the ability to invoke individual features of a pluggable feature pack 308, without necessarily invoking all such features, will likely improve the operational efficiency of the unified agent 306 while simultaneously reducing operational overhead. Accordingly, the unified agent 306 can self-optimize in various embodiments by using the common infrastructure and invoking only those pluggable components that are applicable or needed for a given user behavior.

In certain embodiments, the individual features of a pluggable feature pack 308 are invoked by the unified agent 306 according to the occurrence of a particular user behavior. In various embodiments, the individual features of a pluggable feature pack 308 are invoked by the unified agent 306 according to the context of a particular user behavior. As an example, the context may be the user enacting the user behavior, their associated risk classification, which resource they may be requesting, and so forth. In certain embodiments, the pluggable feature packs 308 are sourced from various cloud services 206. In one embodiment, the pluggable feature packs 308 are dynamically sourced from various cloud services 206 by the unified agent 306 on an as-need basis.

In various embodiments, the unified agent 306 is implemented with additional functionalities, such as event analytics 310. In certain embodiments, the event analytics 310 functionality includes analysis of various user behaviors, described in greater detail herein. In various embodiments, the unified agent 306 is implemented with a thin hypervisor 314, which can be run at Ring −1, thereby providing protection for the unified agent 306 in the event of a breach. As used herein, a thin hypervisor broadly refers to a simplified hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments are possible. Accordingly, the foregoing is not intended to limit the spirit, scope or intent of the invention.

Figure 4:
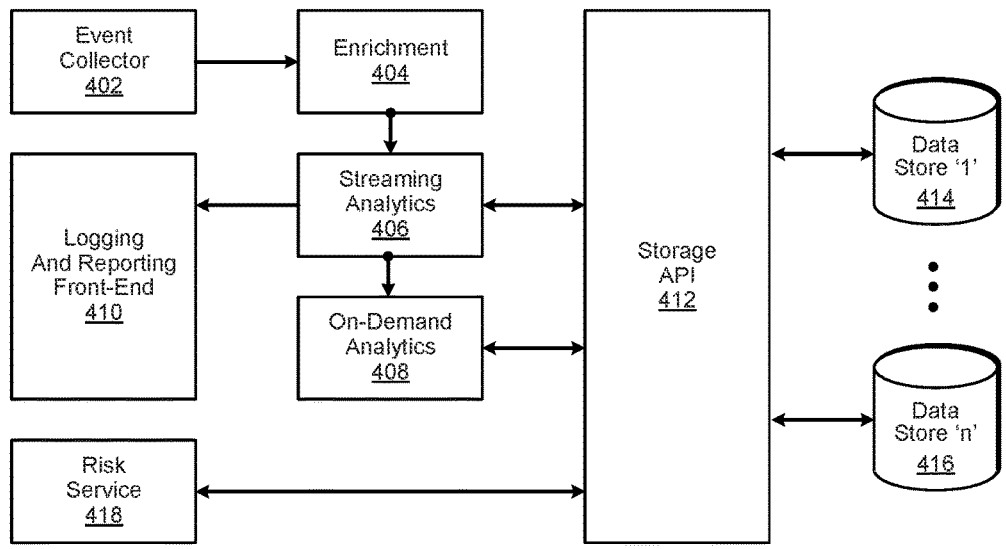
FIG. 4 is a simplified block diagram of a security analytics system.

FIG. 4 is a simplified block diagram of a security analytics system implemented in accordance with an embodiment of the invention. In various embodiments, the security analytics system shown in FIG. 4 is implemented to provide log storage, reporting, and analytics capable of performing streaming 406 and on-demand 408 analytics operations. In certain embodiments, the security analytics system is implemented to provide a uniform platform for storing events and contextual information associated with various user behaviors and performing longitudinal analytics.

As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious.

In various embodiments, the security analytics system is implemented to be scalable. In one embodiment, the security analytics system may be implemented in a centralized location, such as a corporate data center. In this embodiment, additional resources may be added to the security analytics system as needs grow. In another embodiment, the security analytics system may be implemented as a distributed system. In this embodiment, the security analytics system may span multiple information processing systems. In yet another embodiment, the security analytics system may be implemented in a cloud environment. In yet still another embodiment, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 402 is implemented to collect event and contextual information, described in greater detail herein, associated with various user behaviors. In these embodiments, the event and contextual information collected by the event collector 402, as described in greater detail herein, is a matter of design choice. In various embodiments, the event and contextual information collected by the event collector 402 may be processed by an enrichment module 404 to generate enriched user behavior information. In certain embodiments, the enrichment may include certain contextual information related to a particular user behavior.

In certain embodiments, enriched user behavior information is provided by the enrichment module 404 to a streaming 406 analytics module. In turn, the streaming 406 analytics module may provide some or all of the enriched user behavior information to an on-demand 408 analytics module. As used herein, streaming 406 analytics broadly refers to analytics performed in near-real-time on enriched user behavior information as it is received. Likewise, on-demand 408 analytics broadly refers herein to analytics performed, as it is requested, on enriched user behavior information after it has been received.

In one embodiment, the on-demand 408 analytics is performed on enriched user behavior associated with a particular interval of time. In another embodiment, the streaming 406 or on-demand 408 analytics is performed on enriched user behavior associated with a particular user, group of users, one or more entities, or a combination thereof. In yet another embodiment, the streaming 406 or on-demand 408 analytics is performed on enriched user behavior associated with a particular resource, such as a facility, system, data store, or service. Those of skill in the art will recognize that many such embodiments are possible. Accordingly, the foregoing is not intended to limit the spirit, scope or intent of the invention.

In various embodiments, the results of various analytics operations performed by the streaming 406 or on-demand 408 analytics modules are provided to a storage Application Program Interface (API) 412. In turn, the storage API 412 provides access to various data stores '1' 414 through 'n' 416, which are used to store the results of the analytics operations. In certain embodiments, the security analytics system is implemented with a logging and reporting front-end 410, which is used to receive the results of analytics operations performed by the streaming 406 analytics module.

In various embodiments, the security analytics system is implemented to provide a risk management service 418. In certain embodiments, the risk management service 418 is implemented to provide enhanced cyber behavior information as a service. In various embodiments, the risk management service 418 is implemented to provide the results of various analytics operations performed by the streaming 406 or on-demand 408 analytics modules. In certain embodiments, the risk management service 418 is implemented to use the storage API 412 to access various enhanced cyber behavior and analytics information stored on the data stores '1' 414 through 'n' 416. Skilled practitioners of the art will recognize that many such embodiments are possible. Accordingly, the foregoing is not intended to limit the spirit, scope or intent of the invention.

Figure 5:
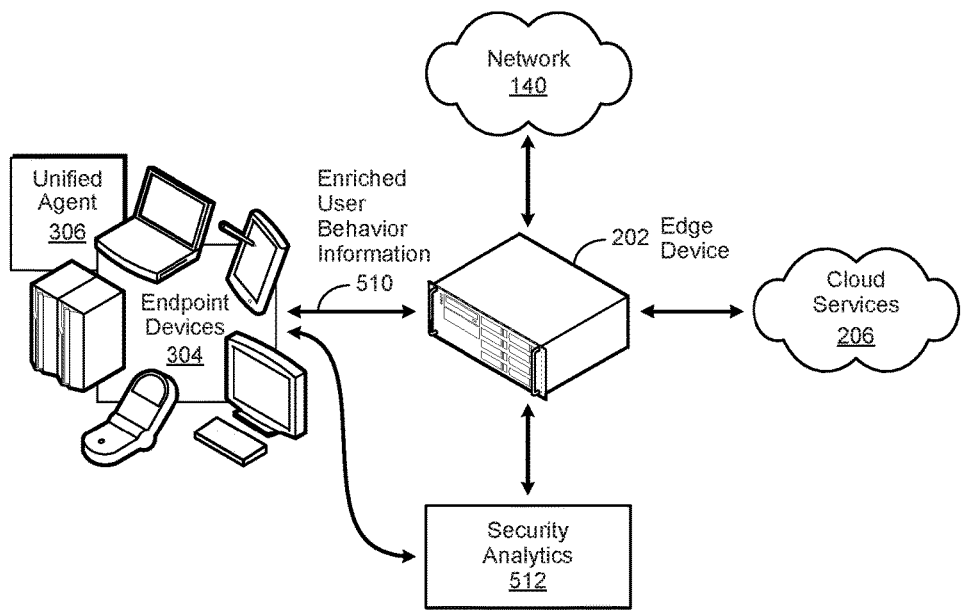
FIG. 5 is a simplified block diagram of a risk-adaptive behavior system.

FIG. 5 is a simplified block diagram of a risk-adaptive behavior system implemented in accordance with an embodiment of the invention. In various embodiments, one or more unified agents 306, one or more edge devices 202, cloud services 206, and a security analytics system 512, all described in greater detail herein, may be implemented to provide a risk-adaptive behavior system, likewise described in greater detail herein. In certain embodiments, the network edge device 202 may be implemented in a bridge, a firewall, or a passive monitoring configuration. In one embodiment, the edge device 202 is implemented as software running on an information processing system. In various embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from a unified agent 306, likewise described in greater detail herein.

In various embodiments, the security analytics system 512, such as the security analytics system depicted in FIG. 4, may be implemented as both a source and a sink of user behavior information. In certain embodiments, the security analytics system 512 may be implemented to serve requests for user/resource risk data, track the risk-adaptive behavior system's overall health, or a combination thereof. In various embodiments, the edge device 202 and the unified agent 306, individually or in combination, may provide certain user behavior information to the security analytics system 512 using either push or pull approaches familiar to skilled practitioners of the art.

As described in greater detail herein, the edge device 202 may be implemented in certain embodiments to receive enriched user behavior information 510 from the unified agent 306. It will be appreciated that such enriched user behavior information 510 will likely not be available for provision to the edge device 202 when a unified agent is not implemented for a corresponding endpoint device 304. However, the lack of such enriched user behavior information may be accommodated in various embodiments, albeit with reduced risk-adaptive behavior functionality.

In various embodiments, a given user behavior may be enriched by an associated unified agent 306 attaching contextual information to a request. In certain embodiments, the contextual information can include detailed context provided from one or more of a sensor, an endpoint, and analytics relating to the given user behavior. In one embodiment, the context is embedded within a network request, which is then provided as enriched user behavior information 510. In another embodiment, the contextual information is concatenated, or appended, to a request, which in turn is provided as enriched user behavior information 510. In these embodiments, the enriched user behavior information 510 is unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests are accompanied by a contextual information packet sent to the edge device 202. In these embodiments, the new flow requests are provided as enriched user behavior information 510. In various embodiments, the unified agent 306 may also send updated contextual information to the edge device 202 once it becomes available. As an example, a unified agent 306 may share a list of files that has been read by a current process at any point in time once the information has been collected. To continue the example, such a list of files may be used to determine which data the unified agent 306 may be attempting to exfiltrate.

In certain embodiments, point analytics processes executing on the edge device 202 may request a particular service. As an example, risk scores on a per-user basis may be requested. In one embodiment, the service may be requested from the security analytics system 512. In another embodiment, the service may be requested from various cloud services 206.

In various embodiments, contextual information associated with a user behavior may be attached to various network service requests. In one embodiment, the request is wrapped and then handled by proxy. In another embodiment, a small packet of contextual information associated with a user behavior is sent with a service request. In certain embodiments, service requests may be related to Domain Name Service (DNS), web, email, file sharing, collaboration, printing and so forth, all of which are essentially requests for service by an endpoint device 304. Accordingly, such requests can be enriched by the addition of user behavior contextual information (e.g., UserAccount, interactive/automated, data-touched, etc.). As a result, the edge device 202 can then use this information to manage the appropriate response to submitted requests.

In various embodiments, the risk-adaptive behavior system shown in FIG. 5 may be implemented in different operational configurations. In one embodiment, the risk adaptive system is implemented by using the unified agent 306 and the security analytics system 512 in combination. In another embodiment, the risk adaptive system is implemented by using the edge device 202 and the security analytics system 512 in combination. In yet another embodiment, the risk adaptive system is implemented by using the unified agent 306, the edge device 202, and the security analytics system 512 in combination. In these embodiments, the cloud services 206 may likewise be implemented for use by the unified agent 306, the edge device 202, and the security analytics system 512, individually or in combination.

In certain embodiments, the risk-adaptive behavior system may be implemented in a unified agent 306 and security analytics system 512 configuration. In these embodiments, the risk-adaptive behavior system may be primarily oriented to performing risk assessment operations related to user actions, program actions, data accesses, or a combination thereof. In various embodiments, program actions are treated as a proxy for the user.

In certain embodiments, the unified agent 306 may be implemented to update the security analytics system 512 with user behavior and associated contextual information, thereby allowing an offload of certain analytics processing overhead. In one embodiment, this approach allows for longitudinal risk scoring, which assesses risk associated with certain user behavior during a particular interval of time. In another embodiment, the security analytics system 512 may be implemented to allow the risk-adaptive behavior system to access risk scores associated with the same user account, but accrued on different endpoint devices 304. It will be appreciated that such an approach may prove advantageous when an adversary is "moving sideways" through a network environment, using different endpoint devices 304 to collect information.

In various embodiments, the risk-adaptive behavior system may be implemented in an edge device 202 and security analytics system 512 configuration. In these embodiments, the risk-adaptive behavior system may be primarily oriented to applying risk mitigations in a way that maximizes security effort return-on-investment (ROI). In certain embodiments, the approach may be accomplished by providing additional contextual and user behavior information associated with user requests. As an example, a web gateway may not concern itself with why a particular file is being requested. Accordingly, if the file cannot be identified with certainty that it is malicious or harmless, there is no context available to determine how, or if, to proceed.

To extend the example, the edge device 202 and security analytics system 512 may be coupled such that the risk-adaptive behavior system can contextualize requests and begin to fit them into a framework that evaluates their associated risk. It will be appreciated that such an embodiment works well with web-based data loss protection (DLP) approaches, as each transfer is no longer examined in isolation, but in the broader context of the user's actions on the network 140.

As another example, the security analytics system 512 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the risk-adaptive behavior system may be implemented in a unified agent 306, edge device 202, and security analytics system 512 configuration. In these embodiments, the risk-adaptive behavior system may be primarily oriented to maximally leverage contextual information associated with various user behaviors within the system. In various embodiments, data flow tracking is performed by one or more unified agents 306, which allows the quantity and type of information associated with particular hosts to be measured. In turn, this information may be used determine how the edge device 202 handles requests. By contextualizing such user behavior on the network 140, the risk-adaptive behavior system can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
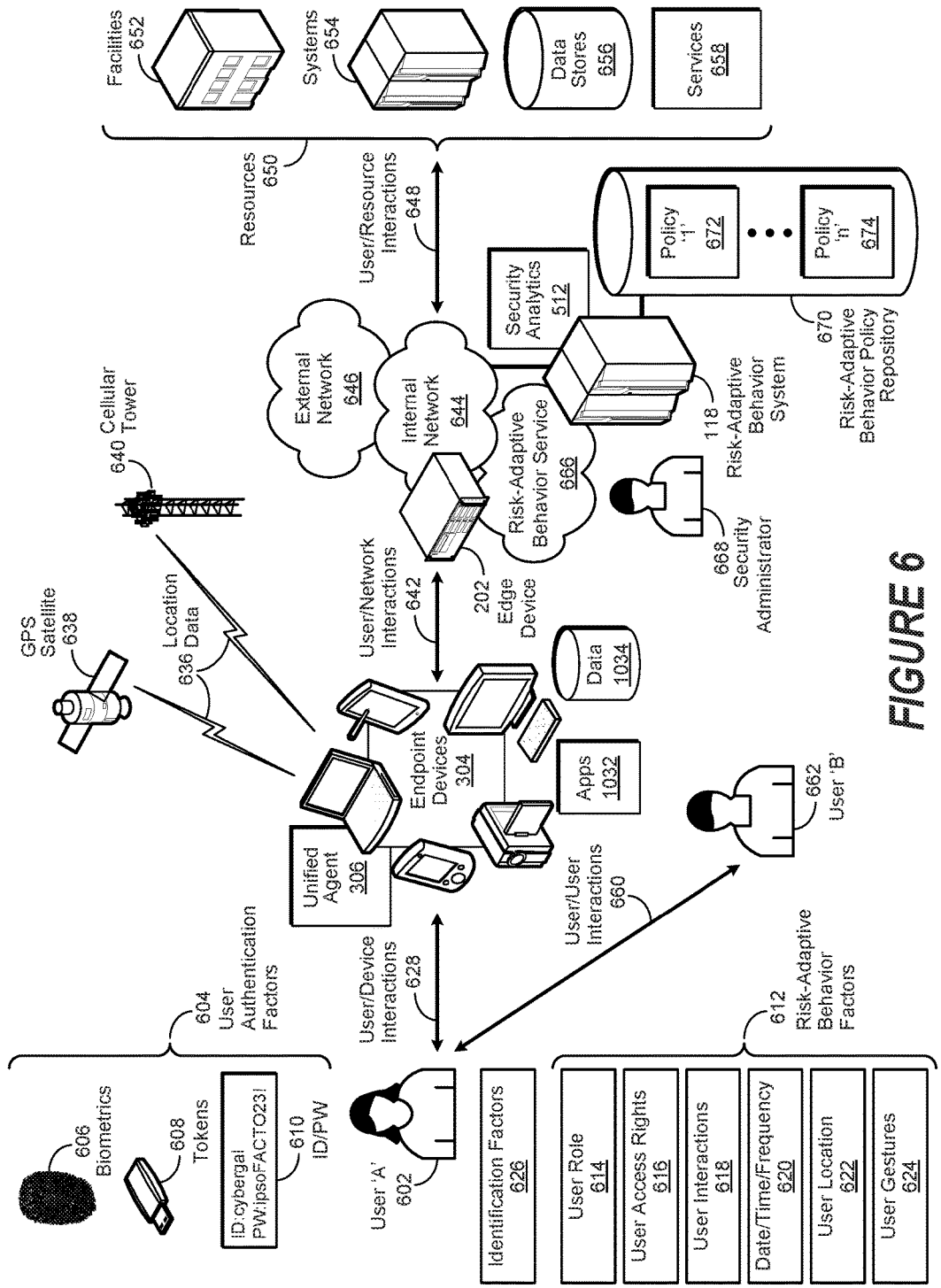
FIG. 6 is a simplified block diagram of risk-adaptive behavior elements and their interrelationship.

FIG. 6 is a simplified block diagram of a risk-adaptive environment having risk-adaptive behavior elements implemented in accordance with an embodiment of the invention and their interrelationship. In various embodiments, a risk-adaptive system 118 is implemented to use contextual information, as described in greater detail herein, to assess the risk associated with a particular user behavior and adaptively respond with an associated response. Consequently, the risk-adaptive behavior system 118 is more oriented in various embodiments to risk adaptation than to security administration. More particularly, various embodiments are directed towards assessing the risk associated with a particular user behavior according to its associated contextual information and responding accordingly to reduce operational overhead and improve system efficiency while maintaining security integrity. In certain embodiments, the risk-adaptive behavior system 118 is implemented to monitor various user behaviors, assess the corresponding risk they may represent, individually or in combination, and adaptively respond with appropriate security countermeasures.

A user behavior element, as likewise used herein, broadly refers to a user's behavior during the performance of a particular operation in a physical realm, cyberspace, or a combination thereof. As an example, user 'A' 602 may use an endpoint device 304 to browse a particular web page on a news site on the Internet. In this example, the individual actions performed by user 'A' 202 to access the web page constitute a user behavior element. As another example, user 'A' 602 may use an endpoint device 304 to download a data file from a particular system 654. In this example, the individual actions performed by user 'A' 602 to download the data file, including the use of one or more user authentication factors 604 for user authentication, constitute a user behavior element.

In various embodiments, a user behavior element may include one or more user behavior activities. A cyber behavior activity, as used herein, broadly refers to a discrete action performed by a user, such as user 'A' 602 or 'B' 662, to enact an associated user behavior element. In various embodiments, such user behavior activities may include the use of user authentication factors 604, user identification factors 626, risk-adaptive behavior factors 612, or a combination thereof, in the enactment of a user behavior by a given user. In certain embodiments, the user authentication factors 604 are used in authentication approaches familiar to skilled practitioners of the art to authenticate a user, such as user 'A' 602 or 'B' 662. In various embodiments, the user authentication factors 604 may include biometrics 606 (e.g., a finger print, a retinal scan, etc.), security tokens 608 (e.g., a dongle containing cryptographic keys), or a user identifier/password (ID/PW) 610.

In certain embodiments, the user risk-adaptive behavior factors 612 may include the user's role 614 (e.g., title, position, role, etc.), the user's access rights 616, the user's interactions 618, and the date/time/frequency 620 of those interactions 618. In various embodiments, the user risk-adaptive behavior factors 612 may likewise include the user's location 622 when the interactions 618 are enacted, and user gestures 624 used to enact the interactions 618. In certain embodiments, the user gestures 624 may include key strokes on a keypad, a cursor movement, a mouse movement or click, a finger swipe, tap, or other hand gesture, an eye or other bodily movement, or some combination thereof. In various embodiments, the user gestures 624 may likewise include the cadence of the user's keystrokes, the motion, force and duration of a hand or finger gesture, the rapidity and direction of various eye movements, or some combination thereof. In one embodiment, the user gestures 624 may include various audio or verbal commands performed by the user.

In certain embodiments, the user interactions 618 may include user/device 628, user/network 642, user/resource 648, user/user 660 interactions, or some combination thereof. In various embodiments, the user/device 628 interactions include an interaction between a user, such as user 'A' 602 or 'B' 662, and an endpoint device 304. In certain embodiments, the endpoint device 304 is used to communicate data through the use of an internal network 644, an external network 646, or a combination thereof.

In various embodiments, the cyber behavior element may be based upon a machine readable representation of some or all of one or more user identification factors 626. In certain embodiments, the user identification factors 626 may include biometric information, personality type information, technical skill level, financial information, location information, peer information, social network information, criminal background information, civil background information, other public records or a combination thereof. The user identification factors 626 may likewise include expense account information, paid time off (PTO) information, data analysis information, personally sensitive information (PSI), personally identifiable information (PII), or a combination thereof. Likewise, the user identification factors 626 may include insider information, misconfiguration information, third party information, or a combination thereof. Skilled practitioners of the art will recognize that many such embodiments are possible. Accordingly, the foregoing is not intended to limit the spirit, scope or intent of the invention.

In certain embodiments, the endpoint device 304 is configured to receive location data 636, which is used as a data source for determining the user's location 622. In one embodiment, the location data 636 may include Global Positioning System (GPS) data provided by a GPS satellite 638. In another embodiment the location data 636 may include certain location data 636 provided by a wireless network, such as from a cellular network tower 640. In yet another embodiment (not shown), the location data 636 may include various Internet Protocol (IP) address information assigned to the endpoint device 304 by an internal 644 or external 646 network.

In various embodiments, the endpoint devices 304 may also include an input device (not shown), such as a keypad, magnetic card reader, token interface, biometric sensor, video surveillance camera, and so forth. In these embodiments, such endpoint devices 304 may be directly, or indirectly, connected to a particular facility 652 or system 654. As an example, the endpoint device 304 may be directly connected to an access/egress system, such as an electronic lock on a door, at a physical facility 652. As another example, the endpoint device 304 may be indirectly connected to a physical security mechanism through a dedicated security network.

In certain embodiments, the user/device 628 interaction may include interaction with an endpoint device 304 that is not connected to a network at the time the interaction occurs. As an example, user 'A' 602 or 'B' 662 may interact with an endpoint device 304 that is offline, using applications 632, accessing data 634, or a combination thereof, it may contain. Those user/device 628 interactions, or their result, may be stored on the endpoint device 304 and then be accessed or retrieved at a later time once the endpoint device 304 is connected to the internal 644 or external 646 networks.

In various embodiments, the user/network 642 interactions may include interactions with an internal 644 network, an external 646 network, or some combination thereof. In these embodiments, the internal 644 and the external 646 networks may include a public network, such as the Internet, a physical private network, a virtual private network (VPN), or any combination thereof. In certain embodiments, the internal 644 and external 646 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In various embodiments the user/resource 648 interactions may include interactions with various resources 650. In certain embodiments, the resources 650 may include various facilities 652 and systems 654, either of which may be physical or virtual, as well as data stores 656 and services 658. In various embodiments, the user/user 660 interactions may include interactions between two or more users, such as user 'A' 602 and 'B' 662. In these embodiments, the user/user interactions 660 may be physical, such as a face-to-face meeting, via a user/device 628 interaction, a user/network 642 interaction, a user/resource 648 interaction, or some combination thereof.

In one embodiment, the user/user 660 interaction may include a face-to-face verbal exchange between two users. In another embodiment, the user/user 660 interaction may include a written exchange, such as text written on a sheet of paper, between two users. In yet another embodiment, the user/user 660 interaction may include a face-to-face exchange of gestures, such as a sign language exchange, between two users. Those of skill in the art will recognize that many such examples of user/device 628, user/network 642, user/resource 648, and user/user 660 interactions are possible. Accordingly, the foregoing is not intended to limit the spirit, scope or intent of the invention.

In certain embodiments, the risk-adaptive behavior system 118 is implemented to observe user behavior at one or more points of observation. In various embodiments, contextual information associated with particular user behaviors are collected at these various point of observation. In one embodiment the user interactions 618 may provide such points of observation. In another embodiment, the endpoint devices 304 and resources 650 may provide such points of observation. Those of skill in the art will recognize that many such points of observation are possible. Accordingly, the foregoing is not intended to limit the spirit, scope or intent of the invention.

In certain embodiments, the user authentication factors 604 are used in combination to perform multi-factor authentication of a user, such as user 'A' 602 or 'B' 662. As used herein, multi-factor authentication broadly refers to approaches requiring two or more authentication factors. In general, multi-factor authentication includes three classes of user authentication factors 604. The first is something the user knows, such as a user ID/PW 610. The second is something the user possesses, such as a security token 608. The third is something that is inherent to the user, such as a biometric 606.

In various embodiments, multi-factor authentication is extended to include a fourth class of factors, which includes one or more risk-adaptive behavior factors 612, one or more user identification factors 626, or a combination thereof. In these embodiments, the fourth class of factors includes user behavior elements the user has done, is currently doing, or is expected to do in the future. In certain embodiments, multi-factor authentication is performed on recurring basis. In one embodiment, the multi-factor authentication is performed at certain time intervals during the enactment of a particular user behavior. In another embodiment, the time interval is uniform. In yet another embodiment, the time interval may vary or be random. In yet still another embodiment, the multi-factor authentication is performed according to the enactment of a particular user behavior, such as accessing a different resource 650.

In various embodiments, certain combinations of the enhanced multi-factor authentication described herein are used according to the enactment of a particular user behavior. From the foregoing, those of skill in the art will recognize that the addition of such a fourth class of factors not only strengthens current multi-factor authentication approaches, but further, allows the factors to be more uniquely associated with one or both of a given user and with a given requested action. Skilled practitioners of the art will likewise realize that many such embodiments are possible. Accordingly, the foregoing is not intended to limit the spirit, scope or intent of the invention.

In certain embodiments, the user behavior monitoring system 118 may be implemented as a stand-alone system. In one embodiment, the cyber behavior monitoring system 118 may be implemented as a distributed system. In another embodiment, the cyber behavior monitoring system 118 may be implemented as a virtual system, such as an instantiation of one or more virtual machines (VMs). In various embodiments, the user behavior monitoring system 118 may be implemented as a user behavior monitoring service 666. In certain embodiments, the behavior monitoring services 666 are implemented in a cloud environment familiar to those of skill in the art. Those of skill in the art will recognize that many such embodiments are possible. Accordingly, the foregoing is not intended to limit the spirit, scope or intent of the invention.

In various embodiments, risk-adaptive behavior system operations are initiated with the authentication of a user, such as user 'A' 602 or 'B' 662. Once authenticated, a determination is made whether the user has one or more associated risk-adaptive behavior policies. If so, then they are retrieved for use in various risk-adaptive behavior system 118 operations, described in greater detail herein. In various embodiments, risk-adaptive behavior policies, such policies '1' 672 through 'n' 674, are retrieved from a repository of risk-adaptive behavior policies 670.

The user's current user behavior is then monitored to identify any applicable risk-adaptive behavior policies that may apply. If one or more applicable risk-adaptive behavior policies have been identified, they are then used to determine an appropriate risk-adaptive behavior response, described in greater detail herein. In various embodiments, a security analytics system 512, described in greater detail herein, is used by the risk-adaptive behavior system 118 to determine the appropriate risk-adaptive behavior response.

Once the appropriate risk-adaptive behavior response has been enacted, a determination is made whether the previously-enacted risk-adaptive behavior response indicates acceptable, unacceptable, anomalous, or malicious user behavior. If so, the user's current cyber behavior is marked accordingly, followed by the performance of unacceptable, anomalous, or malicious user behavior notification operations as appropriate. In one embodiment, the unacceptable, anomalous, or malicious user behavior is stored for later review. In another embodiment, a security administrator 668 is notified of the unacceptable, anomalous, or malicious user behavior.

Figure 7A:
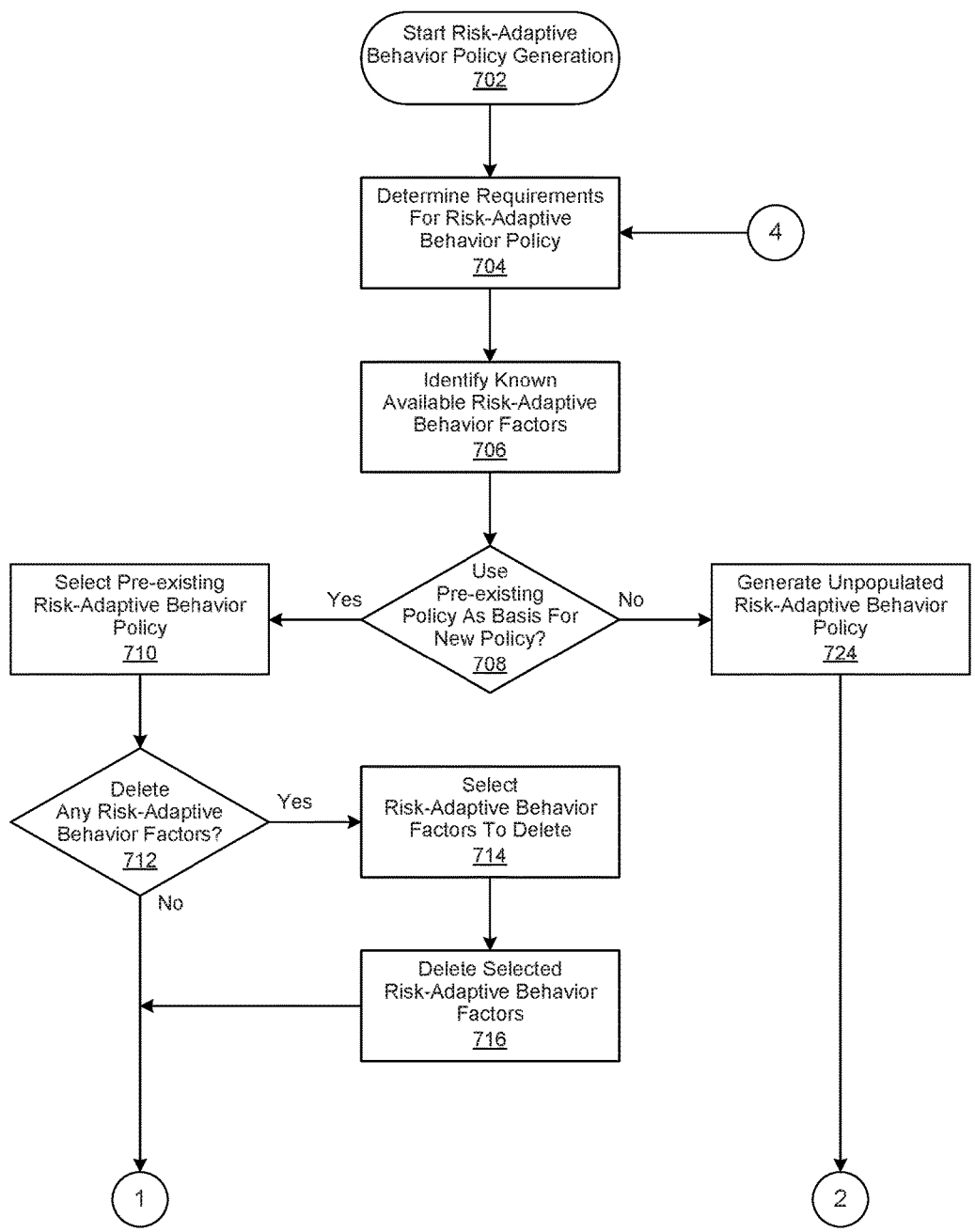
FIGS. 7a through 7c are a generalized flowchart of the performance of risk-adaptive behavior policy generation operations.
Figure 7B:
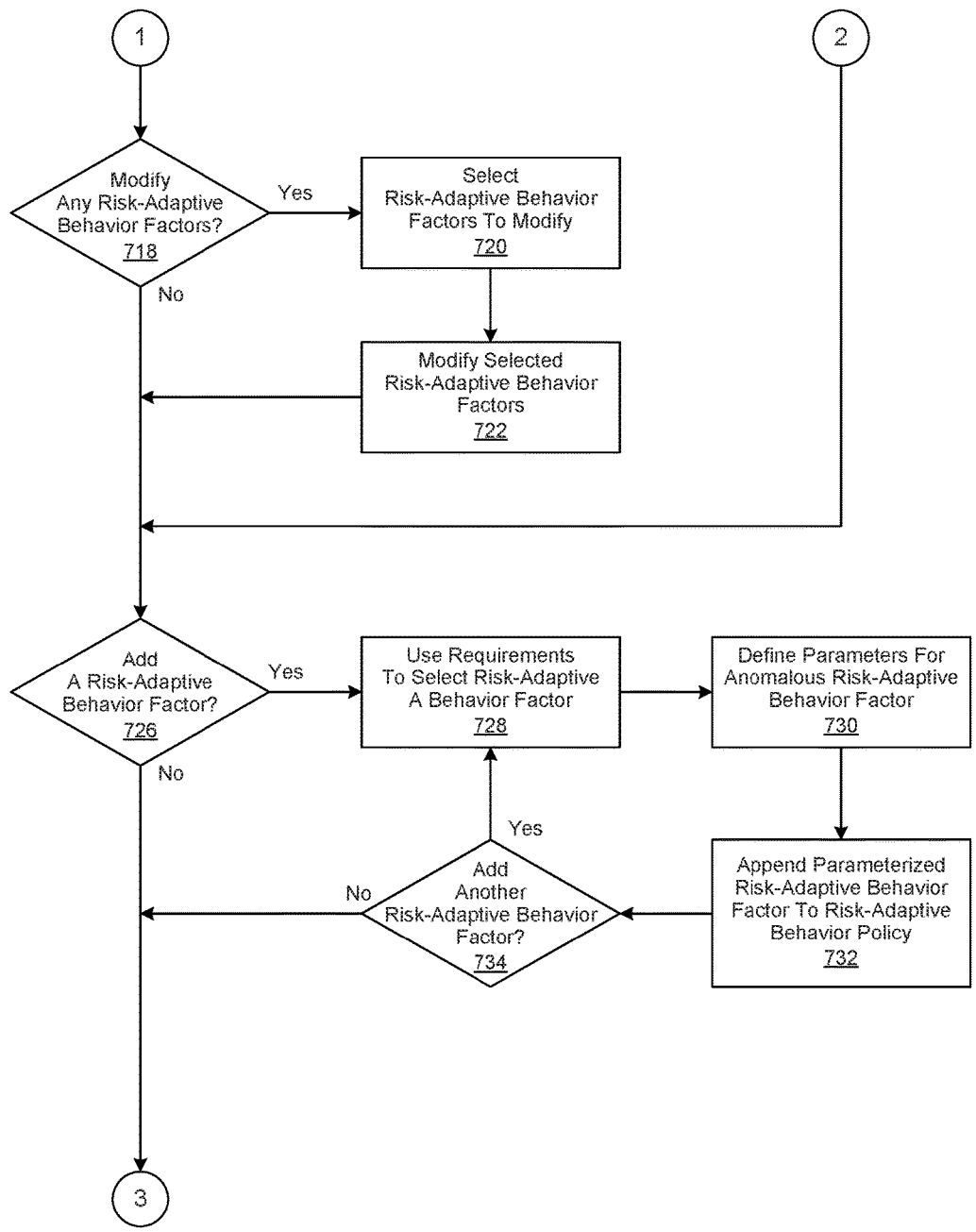
Figure 7C:
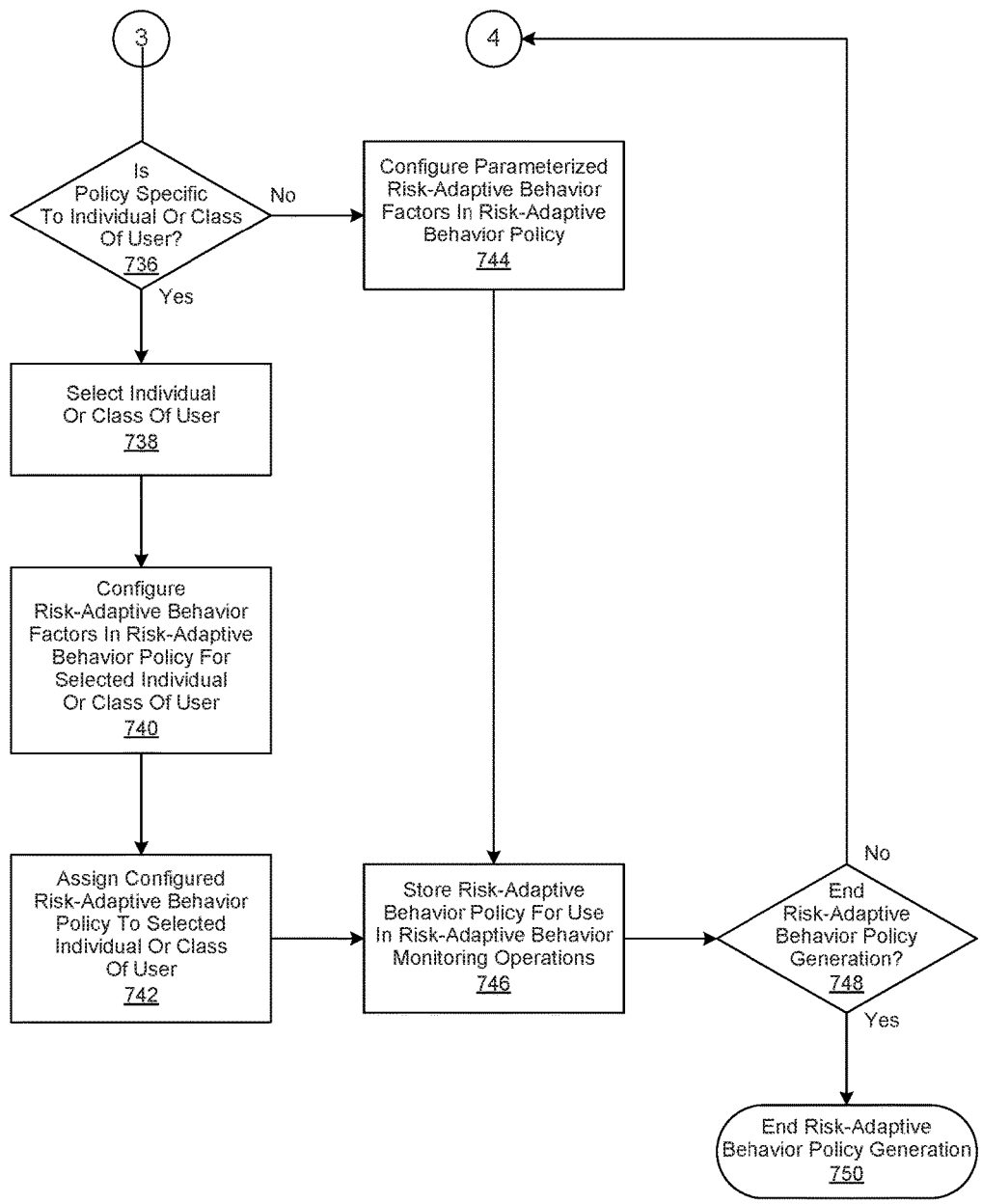

FIGS. 7*a* through 7*c* are a generalized flowchart of the performance of risk-adaptive behavior policy generation operations implemented in accordance with an embodiment of the invention. In this embodiment, risk-adaptive behavior policy generation operations are begun in step 702, followed by determining the requirements of a risk-adaptive behavior policy in step 704. Known available risk-adaptive behavior factors, described in greater detail herein, are identified in step 706, followed by a determination being made in step 708 whether to use a pre-existing risk-adaptive behavior policy as the basis for a new policy. If so, then a pre-existing risk-adaptive behavior policy is selected in step 710, followed by a determination being made in step 712 whether to delete any risk-adaptive behavior factors it may utilize. If so, then any relevant risk-adaptive behavior factors are selected in step 714, followed by their deletion in step 716.

Thereafter, or if it was decided in step 712 to not delete any risk-adaptive behavior factors associated with the pre-existing risk-adaptive behavior policy, then a determination is made in step 718 whether to modify any risk-adaptive behavior factors it may utilize. If so, then any relevant risk-adaptive behavior factors are selected in step 720, followed by their modification in step 722. However, if it was decided in step 708 to not use a pre-existing risk-adaptive behavior policy for a new policy, then an unpopulated risk-adaptive behavior policy is generated in step 724.

Thereafter, or if it was decided in step 718 to not modify any risk-adaptive behavior factors associated with the pre-existing risk-adaptive behavior policy, then a determination is made in step 726 whether to add a risk-adaptive behavior factor. If so, then the requirements determined in step 704 are used in step 728 to select a risk-adaptive behavior factor, followed by defining parameters associated with the risk-adaptive behavior factor in step 730. In various embodiments, the parameters are used by a risk-adaptive behavior system, described in greater detail herein, to identify cyber behavior including some or all of acceptable, unacceptable, anomalous or malicious cyber behavior. In these embodiments, the parameters, and their associated definitions, are a matter of design choice.

The parameterized risk-adaptive behavior factor is then appended to the risk-adaptive behavior policy in 732, followed by a determination being made in step 734 whether to add another risk-adaptive behavior factor to the risk-adaptive behavior policy. If so, then the process is continued, proceeding with step 728. Otherwise, or if it was decided in step 726 not to add a risk-adaptive behavior factor, then a determination is made in step 736 whether the risk-adaptive behavior policy is specific to an individual or class of user. If so, then an individual or class of user is selected in step 738 and the risk-adaptive behavior policy is configured accordingly in step 740. In certain embodiments, the method by which an individual or class of user is selected, and the risk-adaptive behavior policy is configured, is a matter of design choice.

The configured risk-adaptive behavior policy is then assigned to the selected individual or class of user in step 742. However, if it was decided in step 736 that the risk-adaptive behavior policy was not specific to an individual or class or user, then the parameterized risk-adaptive behavior factors in the risk-adaptive behavior policy are configured in step 744. Thereafter, or after the risk-adaptive behavior policy is assigned to a specific individual or class of user in step 742, the risk-adaptive behavior policy is stored in step 746 for use in risk-adaptive behavior system operations.

In one embodiment, the risk-adaptive behavior policy is stored in a repository of risk-adaptive behavior policies. In another embodiment, the repository of risk-adaptive behavior policies is implemented for use by a single risk-adaptive behavior monitoring system. In yet another embodiment, the repository of risk-adaptive behavior policies is implemented for use by a plurality of risk-adaptive behavior systems. A determination is then made in step 748 whether to end risk-adaptive behavior policy operations. If not, the process is continued, proceeding with step 704. Otherwise, risk-adaptive behavior policy generation operations are ended in step 750.

Figure 8:
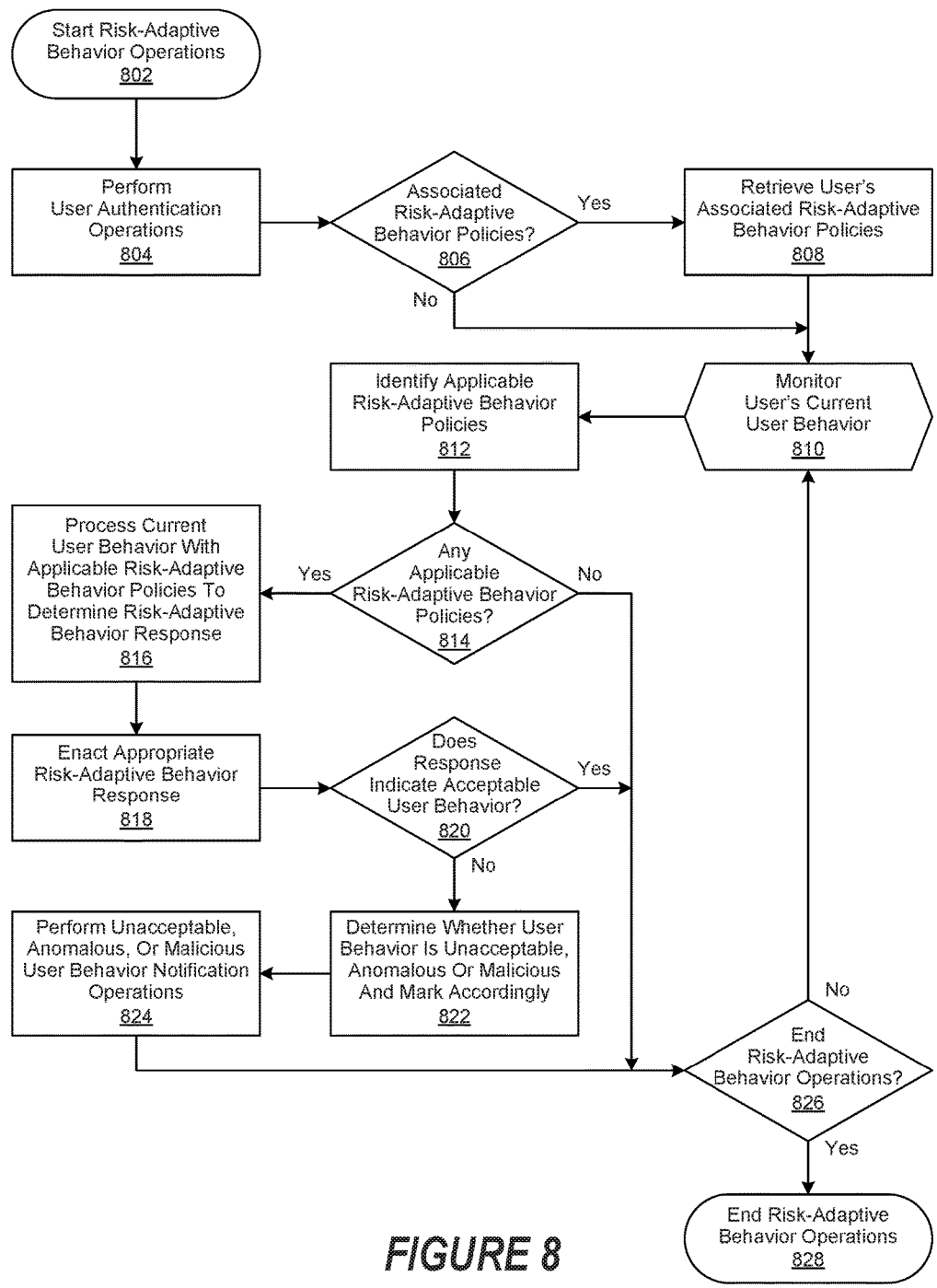
FIG. 8 is a generalized flowchart of the performance of risk-adaptive behavior system operations to adaptively manage user behavior risk.

FIG. 8 is a generalized flowchart of the performance of risk-adaptive behavior system operations implemented in accordance with an embodiment of the invention to adaptively manage user behavior risk. In this embodiment, risk-adaptive behavior system operations are begun in step 802, followed by the performance of user authentication operations, familiar to those of skill in the art, in step 804. A determination is then made in step 806 whether the user has one or more associated risk-adaptive behavior policies. If so, then they are retrieved for use in step 808. Thereafter, or if it was determined in step 806 that the user has no associated risk-adaptive behavior policies, the user's user behavior is monitored in step 810.

The user's current user behavior is then processed in step 812 to identify any applicable risk-adaptive behavior policies that may apply. A determination is then made in step 814 whether any applicable risk-adaptive behavior policies have been identified. If not, a determination is made in step 826 whether to end risk-adaptive behavior system operations. If not, then the process is continued, proceeding with step 810. Otherwise, risk-adaptive behavior system operations are ended in step 828.

However, if it is determined in step 814 that one or more applicable risk-adaptive behavior policies have been identified, then they are used in step 816 to process the user's current user behavior to determine an appropriate risk-adaptive behavior response. The appropriate risk-adaptive behavior response is then enacted in step 818, followed by a determination being made in step 820 whether the risk-adaptive behavior response enacted in step 818 indicates acceptable user behavior.

If so, then the process is continued, proceeding with step 826. Otherwise the user's current user behavior is determined to be unacceptable, anomalous, or malicious and marked accordingly in step 822. Unacceptable, anomalous, or malicious user behavior notification operations are then performed in step 824. In one embodiment, the unacceptable, anomalous, or malicious user behavior is stored for later review. In another embodiment, a security administrator is notified of the unacceptable, anomalous, or malicious user behavior. Thereafter, the process is continued, proceeding with step 826.

Figure 9:
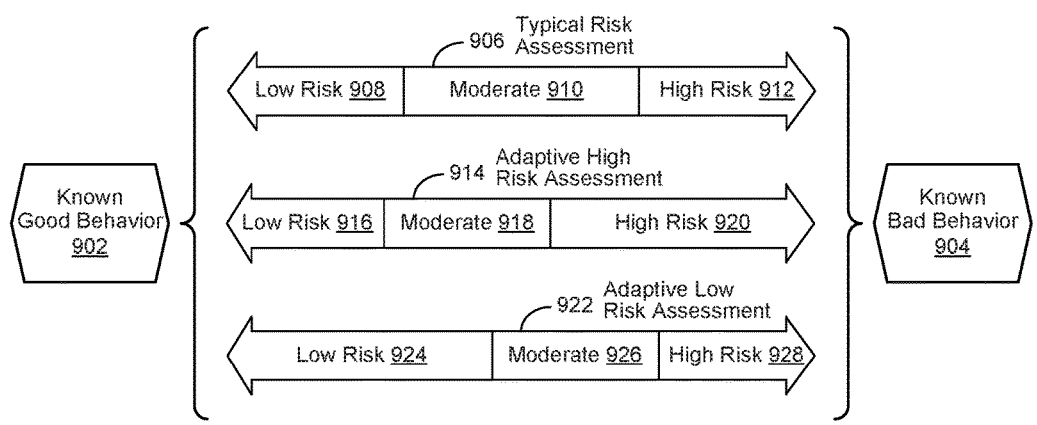
FIG. 9 is a simplified block diagram of the operation of a risk-adaptive behavior system for adaptively assessing risk associated with a user behavior.

FIG. 9 is a simplified block diagram of the operation of a risk-adaptive behavior system implemented in accordance with an embodiment of the invention to adaptively assess risk associated with a user behavior. In this embodiment, the user behavior is monitored and compared to known good behavior 902 and known bad behavior 904. In typical risk assessment 906 approaches, low 908, moderate 910, or high 912 risk user behavior is generally determined by using fairly inflexible security policies, which are typically used to enact relatively static responses.

As an example, a security policy implemented for access control may have a list of actions a particular user can do and a list of things they cannot. Ordinarily, the actions in those lists are static and don't change, regardless of the particular user behavior being enacted by the user. However, perhaps they should change, or adapt, if it is determined the user behavior being enacted by the user has changed, and as a result, represents a higher risk.

To continue the example, a user may be perusing various resources and happens to access a webpage, such as a shopping site, that contains certain objects. Typical security approaches assume some portion of those objects to be good, a small number are known to be bad, and the remainder suspicious. Consequently, there is a continuum of objects, some assumed to be good, some undetermined, and the rest known to be bad. It will be appreciated that the determination of what is considered to be good, undetermined or bad is oftentimes fairly arbitrary.

In various embodiments, contextual information associated with the user behavior being enacted by the user is collected and processed to adaptively respond to changes in the user's current user behavior. In continuance of the example, the user may change their user behavior to access internal business resources. In this example, accessing internal business resources is contextual information that may represent the potential for higher risk. As a result, a risk-adaptive behavior system may be implemented in certain embodiments to respond with an adaptive high risk assessment 914. In various embodiments, the adaptive high risk assessment 914 is generated by a security analytics system, described in greater detail herein. Consequently, the adaptive high risk assessment 914 may indicate a larger percentage of certain user behavior as high 920 risk, and a smaller percentage as low 916 or moderate 918 risk.

In further continuance of the example, the user may further change their user behavior to access an external new site. As before, the user's access of an external news site is contextual information that may represent the likelihood of lower risk. As a result, the risk-adaptive behavior system may be implemented to respond with an adaptive low risk assessment 922, which may indicate a larger percentage of certain user behavior as low 924 risk, and a smaller percentage as moderate 926 or high 928 risk.

It will be appreciated that without the described adaptive behavior, the operational overhead administering user security would be high, as all user interactions related to their user behavior would continue to be monitored. However, the cost of administering user security would decrease when the user was no longer interacting with internal resources. Consequently, risk tolerance can be dynamically adjusted according to the context of a given user activity.

More particularly, if the user's activity is primarily internal to the organization, then some risk can be tolerated. However, if the user's activity is primarily external to the organization, then it is possible that essentially all risk can be tolerated. Furthermore, the user experience may be more pleasant during non-organization activities, as fewer security controls may be applied or experienced. Moreover, the risk assessment becomes dynamic, according to the identity of the user, the resources being accessed, their respective user behavior, and corresponding points of observation.

Figure 10:
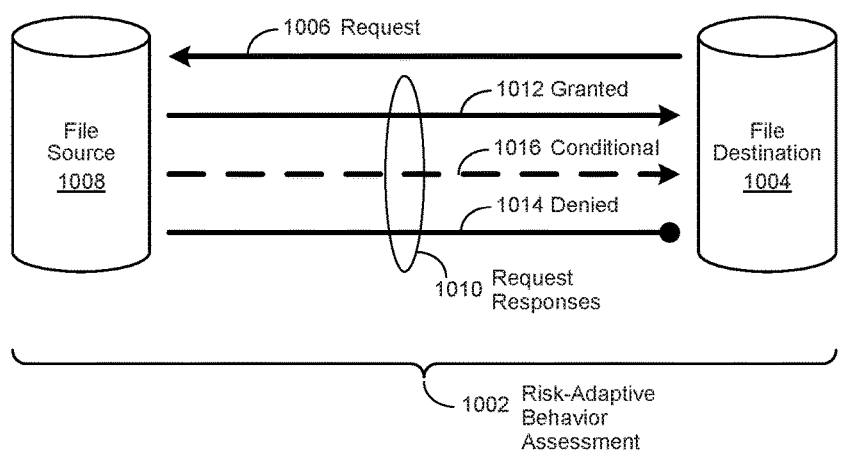
FIG. 10 is a simplified block diagram of the operation of a risk-adaptive behavior system for adaptively responding to a user request.

FIG. 10 is a simplified block diagram of the operation of a risk-adaptive behavior system implemented in accordance with an embodiment of the invention to adaptively respond to a user request. In this embodiment, a user may place a request 1006 to download a file from a file source 1008 to a file destination 1004, such as a USB drive. In traditional security approaches, the owner of the requested file may have a single security rule, which would be a granted 1012, or denied 1014, request response 1010 as to whether the user was allowed to download the file.

In various embodiments, a risk-adaptive behavior policy, as described in greater detail herein, may be implemented such that the user's request 1006 to download the requested file is typically granted 1012. However, the user may have recently updated their online resume as well as begun to take random days off, which may imply a flight risk. By extension, the user behavior and other actions associated with the user may likewise imply the user's intent to take proprietary information with them to a new job. Consequently, various risk-adaptive behavior approaches, described in greater detail herein, may yield a denied 1014 request response 1010 due to the associated context of their user behavior, other actions, or a combination thereof.

Alternatively, a risk-adaptive behavior policy may be implemented in various embodiments to provide a conditional 1016 request response 1010. As an example, the requested file may be encrypted such that it can only be opened on a corporate computer. Furthermore, attempting to open the file on a non-corporate computer may result in a message being sent to a security administrator. Likewise, a single file being downloaded may appear as good behavior, yet multiple sequential downloads may appear suspicious, especially if the files do not appear to be related, or possibly, if they do. From the foregoing, it will be appreciated that risk-adaptive behavior is not necessarily based upon an atomic action, but rather a multiplicity of factors, such as contextual information associated with particular user behavior.

Figure 11:
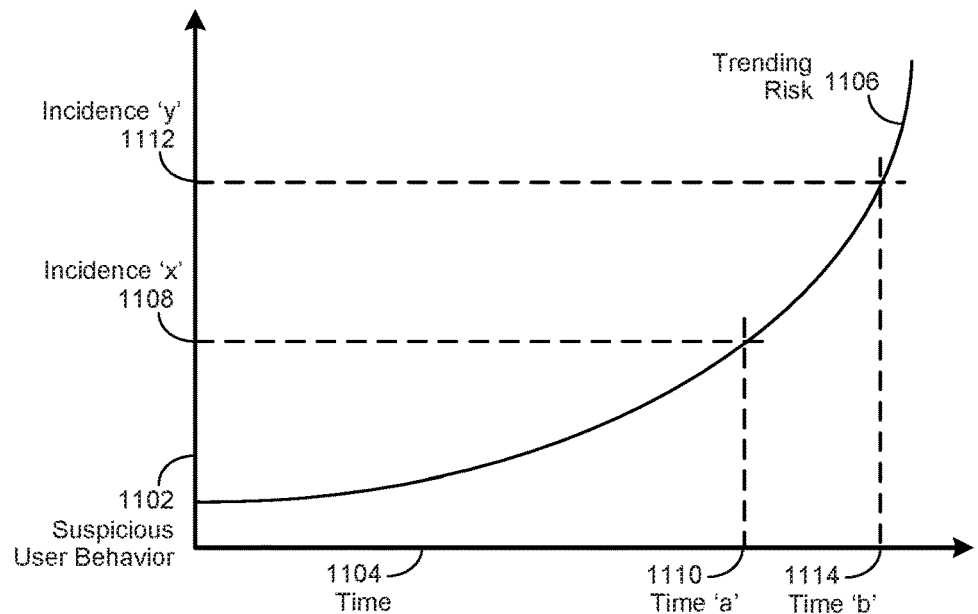
FIG. 11 is a graphical depiction of the operation of a risk-adaptive behavior system for adaptively assessing risk associated with a user behavior.

FIG. 11 is a graphical depiction of the operation of a risk-adaptive behavior system implemented in accordance with an embodiment of the invention to adaptively assess risk associated with a user behavior. In this embodiment, incidence of suspicious user behavior 1102 associated with a particular user is increasing over time 1104, which indicates trending risk 1106 is likewise increasing. Traditional security approaches would typically enact a response once the suspicious user behavior 1102 reached an incidence 'y' 1112 at time 'b' 1114. However, the enactment of such a response may be too late.

In various embodiments, predictive analytics approaches familiar to those of skill in the art are implemented in combination with a risk-adaptive behavior system, described in greater detail herein. In certain of these embodiments, a user behavior associated with a particular user may be monitored to track a particular trending risk 1106. Accordingly, suspicious user behavior 1102 may be predictively identified at incidence level 'x' 1102, occurring at time 'a' 1110. Accordingly, risk can be adaptively assessed, and if warranted, an appropriate security response can be enacted.

Figure 12:
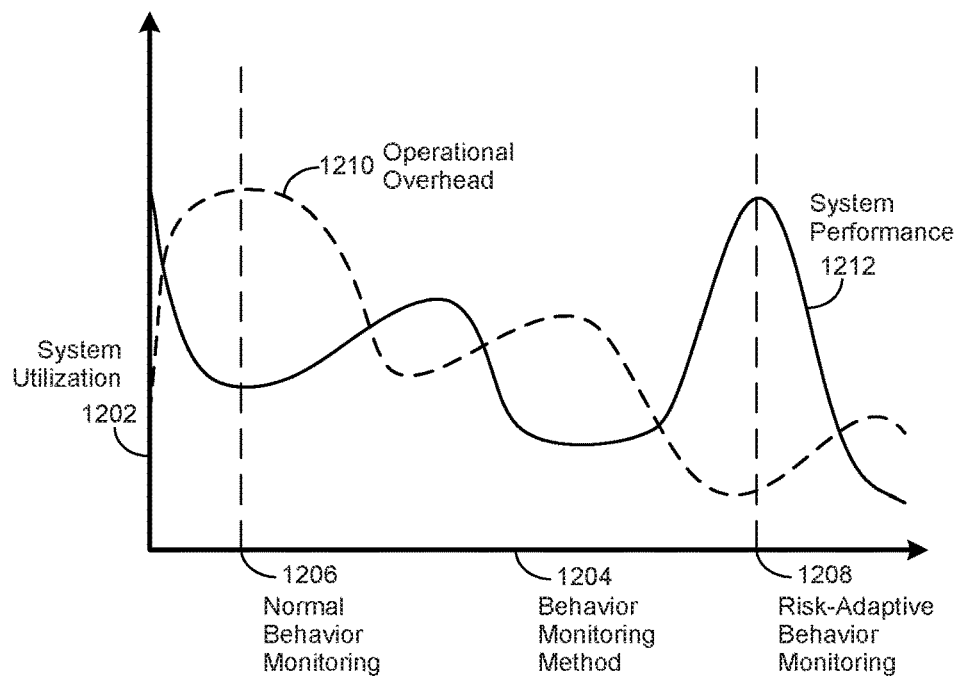
FIG. 12 is a graphical depiction of the operation of a risk-adaptive behavior system for optimizing system efficiency by adaptively assessing user behavior risk.

FIG. 12 is a graphical depiction of the operation of a risk-adaptive behavior system implemented in accordance with an embodiment of the invention to optimize system efficiency by adaptively assessing user behavior risk. In various embodiments, unified agents, described in greater detail herein, are implemented such that they are able to self-optimize to improve system utilization 1202. It will be appreciated that software agents may be CPU-bound or I/O-bound for particular operations. Accordingly, a unified agent may be implemented in certain embodiments such that it relinquishes some functionality according to which computing resources are available.

As an example, there may be a trade-off between the risk exposure associated with a particular user behavior, such as a user request, and its associated operational overhead 1210, according to the user behavior monitoring method 1204 implemented. Consequently, normal user behavior monitoring 1206 approaches may result in high operational overhead 1210 and low system performance 1212. In contrast, risk-adaptive approaches may result in the amount of user behavior monitoring being adjusted according to the amount of presumed user risk. As a result, risk-adaptive cyber behavior monitoring 1208 approaches may result in lower operational overhead 1210 and higher system performance 1212.

To continue the example, if user risk is always presumed to be high, then operational overhead 1210 will be high and system performance 1212 will be low. However, if user risk can be adaptively assessed to be lower, then operational overhead 1210 can likewise be assumed to be lower, thereby freeing up resources to allow higher system performance 1212, thereby optimizing system utilization 1202.

Figure 13:
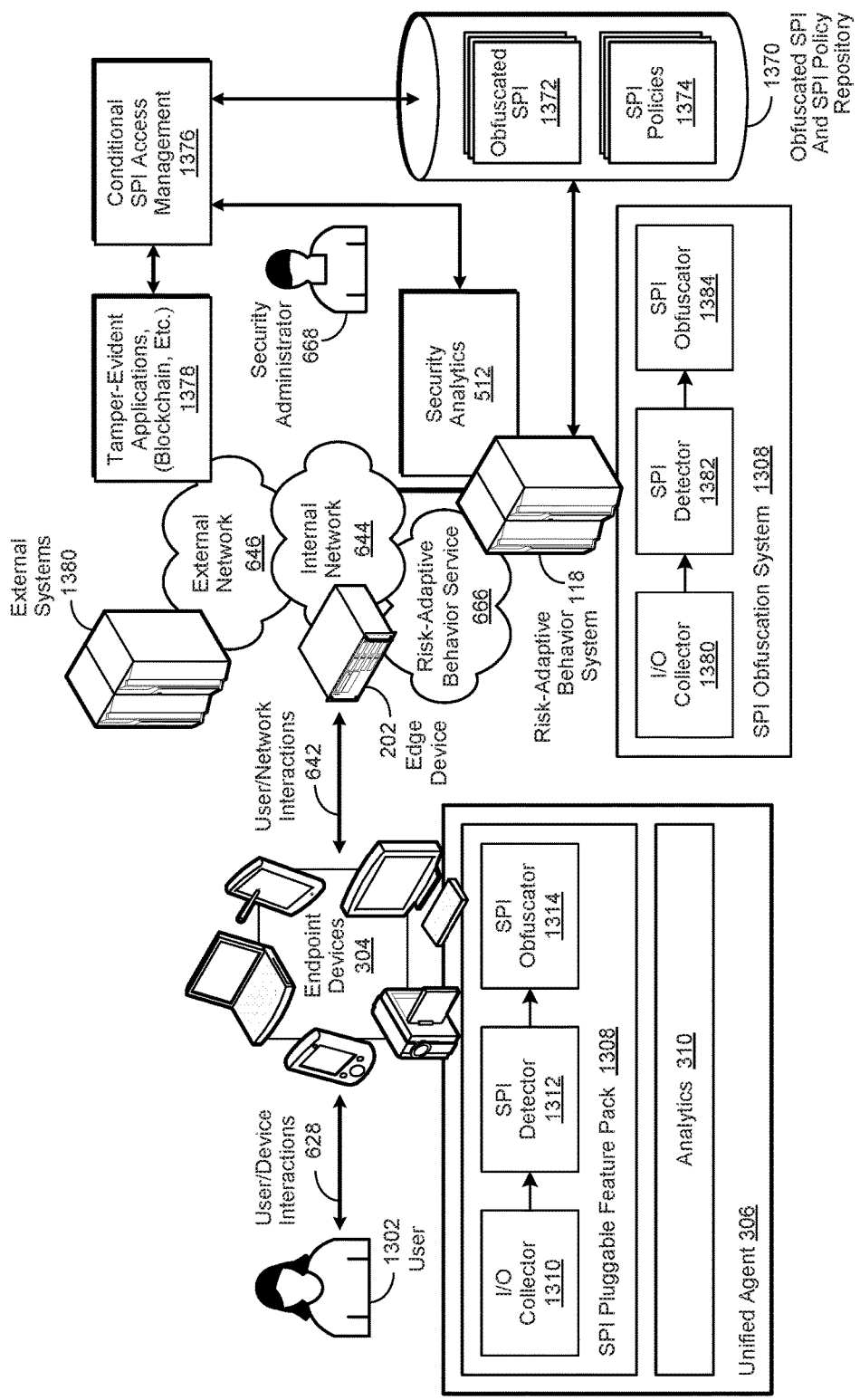
FIG. 13 is a simplified block diagram of the operation of a risk-adaptive behavior system for obfuscating and conditionally accessing a user's sensitive personal information (SPI)

FIG. 13 is a simplified block diagram of a risk-adaptive environment for obfuscating and conditionally accessing a user's sensitive personal information (SPI). As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Another aspect of SPI is any information associated with a particular individual that is considered confidential. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

Other examples of SPI may include national identification numbers, such as a Social Security Number (SSN) or a passport number, vehicle registration plate and serial numbers, and driver's license numbers. Additional examples of SPI may include user identifiers and passwords, email addresses, social media identifiers, credit and debit card numbers, personal identification numbers (PINs), and other digital identity information. Yet other examples of SPI may include biometrics, system access rights, personality type information, various financial information, such as credit scores, personal correspondence, and other confidential information. Skilled practitioners of the art will recognize that many such examples of SPI are possible. Accordingly, the foregoing is not intended to limit the spirit, scope, or intent of the invention.

Those of skill in the art will likewise be aware that it is not uncommon for hackers, criminals and other actors to use various SPI to impersonate a user 1302 in order to gain unauthorized access to various systems, data, or facilities. It is likewise not uncommon for such individuals to masquerade as a user in order to collect their associated SPI for the purpose of identity theft. One known approach to gathering a user's 1302 SPI is to illicitly capture a data stream, such as a flow of network packets that include SPI sent by a user 1302 to another machine, such as a particular external system 1380. Defenses against such approaches include encrypting the data stream prior to being communicated across a network, such as the internal 644 or external 646 shown in FIG. 13.

However, other approaches, such as the use of a key logger, may surreptitiously capture the user's 1302 keystrokes or user gestures and communicate the resulting data stream in their native form to a hacker or other infiltrator. Another issue is the possibility that a normally-trusted insider, such as a security administrator 668, may have access to a decrypted data stream as part of their day-to-day responsibilities. As an example, a security administrator 668 may be using a security analytics 512 system to perform a threat analysis related to a particular user 1302. In the process, they may be exposed to various SPI associated with the uses 1302, such as certain user IDs and passwords. It will be appreciated that such exposure creates the opportunity for a security breach, whether intended or not. Another approach is to impersonate a legitimate website. In such approaches, the user 1302 may navigate to the site and innocently enter their passwords, only to have them captured for later use in illegal or illicit activities.

In various embodiments, a risk-adaptive behavior system 118 is implemented to monitor user behavior associated with a user 1302. In certain embodiments, the user behavior is monitored during user/device interactions 628 between the user 1302 and an endpoint device 304. In various embodiments, as described in greater detail herein, a unified agent 306 is implemented on the endpoint device 304 to perform the user behavior monitoring. In certain embodiments, an SPI obfuscation system 1308 is implemented in combination with a risk-adaptive behavior system 118 to perform the user behavior monitoring.

In various embodiments, the unified agent 306 may be implemented to include an analytics 310 module and an SPI pluggable feature pack 1308. In certain embodiments, the SPI pluggable feature pack 1308 is further implemented to include a I/O collector 1310 module, an SPI detector 1312 module, and an SPI obfuscator 1314 module. In various embodiments, the SPI obfuscation system 1308 is likewise implemented to include an I/O collector 1380 module, an SPI detector 1382 module, and an SPI obfuscator 1384 module.

In certain of these embodiments, the I/O collector 1310, 1380 module is implemented to capture I/O information resulting from user/device interactions 628 between a user 1302 and a device such as endpoint device 304. In certain embodiments, the information resulting from user/device interactions include one or more of data streams of the user/device interactions, events relating to the user/device interactions and metadata associated with the user/device interactions. In one embodiment, the unified agent 306 is implemented to communicate a data stream containing one or more user/device interactions 628 to the I/O collector 1380 implemented in the SPI obfuscation system 1308. In various embodiments, the SPI detector 1312, 1382 module is likewise implemented to identify various SPI in the resulting I/O information (e.g., the data streams), which is respectively provided to an SPI obfuscator 1314, 1384 module. In certain embodiments, the SPI obfuscator 1314 module is implemented to obfuscate, obscure, or mask any identified SPI prior to it being communicated between the user's 1302 endpoint device 304 during a user/network interaction 642 with an edge device 202 implemented on an internal network 644. In certain embodiments, the SPI obfuscator 1384 module is implemented to obfuscate, obscure, or mask any identified SPI prior to it being stored as obfuscated SPI 1372 in a repository of obfuscated SPI and SPI policy information 1370.

In various embodiments, the SPI is converted to an SPI indication by the SPI obfuscator 1314, 1318. In certain embodiments, the SPI indication includes a tokenized version of the SPI. In one embodiment, individual SPI elements (e.g., password, Social Security Number, etc.) are tokenized with a hash and cannot be easily reversed to disclose the actual SPI. In this embodiment, the resulting tokenized SPI is difficult to use in a way that would cause a security breach. However, it will be appreciated by those of skill in the art that such tokenized SPI can prove useful when comparing two entries, such as a tokenized password, as they will share the same value. In certain embodiments, the risk-adaptive behavior system 118 may be implemented to heuristically determine whether a user 1302 typed their own password, and if not, notify an investigator, such as a security administrator 668. In these embodiments, the notification may indicate that the user 1302 is attempting to use SPI that does not belong to them. Alternatively, the risk-adaptive behavior system 118 may be implemented to enroll all submitted passwords for examination of associated activities to detect possible malicious or unauthorized behavior or accidental disclosure by the user 1302.

In various embodiments, the SPI obfuscator 1314, 1384 module is implemented to use cryptographic approaches familiar to those of skill in the art to encrypt the SPI detected by the SPI detector 1312, 1382 module. In certain of these embodiments, the encrypted SPI may be decrypted as a result of granting a requestor, such as a security administrator 668, access to obfuscated SPI 1372. In various embodiments, the resulting obfuscated SPI is parsed from the data stream by a risk-adaptive behavior system 118 and stored as obfuscated SPI 1372 in a repository of obfuscated SPI and SPI policies 1370 for use in associated risk-adaptive behavior system 118 operations, described in greater detail herein.

In certain embodiments, conditional access to a particular user's 1302 SPI, stored as obfuscated SPI 1372, is managed through the implementation of a conditional SPI management system 1376. In various embodiments, the conditional SPI management system 1376 is implemented to retrieve obfuscated SPI 1372 from a repository of obfuscated SPI and SPI policies 1370, according to an associated SPI policy 1374. In certain embodiments, an obfuscated token associated with a particular user/device interaction 628 is used by the conditional SPI access management system 1376 to identify its corresponding obfuscated SPI 1372. Once identified, the obfuscated SPI 1372 is retrieved and then processed to return the user's 1302 non-obfuscated SPI for examination. In various embodiments, the obfuscated SPI 1372 may be stored in encrypted form. In these embodiments, decryption operations familiar to those of skill in the art are used to decrypt the obfuscated SPI 1372 into non-obfuscated SPI.

In certain embodiments, a tamper-evident application 1378 may be implemented to store a record of each request for conditional SPI access to obfuscated SPI 1372 and any associated risk-adaptive behavior system 118 operations. In various embodiments, the tamper-evident application 1378 may be implemented using a blockchain. In certain of these embodiments, each request for conditional SPI access to obfuscated SPI 1372, and any associated risk-adaptive behavior system 118 operations, may be stored as a separate block in the blockchain. In various embodiments, the tamper-evident application 1378 may be implemented on an external system 1380. In these embodiments, the tamper-evident application 1378 may be implemented to provide immutability of requests for conditional SPI access to obfuscate SPI 1372 and their associated risk-adaptive behavior system 118 operations. Skilled practitioners will recognize that many such embodiments are possible. Accordingly, the foregoing is not intended to limit the spirit, scope or intent of the invention.

Referring now to FIG. 13, SPI obfuscation and conditional access policy ("SPI policy") generation operations are begun in various embodiments by first determining the requirements for a particular SPI policy. Known user authentication factors, identification factors, and risk-adaptive behavior factors, all described in greater detail herein, are then identified, as well as where they are used, and how. In various embodiments, the risk-adaptive behavior system 118 may be implemented to learn where a user 1302 enters their SPI in certain application. In certain embodiments, the risk-adaptive behavior system 118 may perform the learning through the implementation of machine learning approaches familiar to those of skill in the art.

If it's decided to use a pre-existing SPI policy as the basis for a new policy, then one is selected, followed by deleting any associated SPI user factors that are not applicable for the new policy. Likewise, if it's decided to modify any of the SPI's remaining SPI user factors, then their associated risk-adaptive behavior obfuscation instructions are modified as appropriate for the requirements of the new SPI policy. However, if it was decided to not use a pre-existing SPI policy for the new policy, then an unpopulated SPI is generated.

Additional SPI user factors are then selected and added to the new SPI policy. Once added, the requirements for the new SPI policy are then used to define their associated obfuscation instruction parameters. In various embodiments, the instruction parameters are used by a risk-adaptive behavior system 118, described in greater detail herein, to obfuscate a user's 1302 SPI such that it is communicated in a tokenized or encrypted form. In these embodiments, the instruction parameters, and the method of tokenization or encryption used for obfuscation of the user's 1302 SPI, are a matter of design choice.

The parameterized SPI user factors are then appended to the SPI policy, followed by a determination being made whether the new SPI policy is specific to an individual or class of user. If so, then an individual or class of user is selected and the new SPI policy is configured accordingly. In certain embodiments, the method by which an individual or class of user is selected, and how the SPI policy may be configured, is a matter of design choice.

The configured SPI policy is then assigned to the selected individual or class of user. Thereafter, the SPI policy is stored in a repository of obfuscated SPI and SPI policies 1370 for use in risk-adaptive behavior system 118 operations described in greater detail herein. In one embodiment, the repository of obfuscated SPI and SPI policies 1370 is implemented for use by a single risk-adaptive behavior monitoring system 118. In another embodiment, the repository of obfuscated SPI and SPI policies is implemented for use by a plurality of risk-adaptive behavior systems 118.

In certain embodiments, SPI obfuscation operations are begun by performing user authentication operations, familiar to those of skill in the art, to authenticate a user 1302. If it is determined that the user 1302 has one or more associated SPI policies 1374, described in greater detail herein, then they are retrieved from the repository of obfuscated SPI and SPI policies 1370. The user's current user behavior is then processed to identify any applicable SPI policies 1374 that may apply. If so, then they are used to process the user's current user behavior to determine an appropriate risk-adaptive behavior SPI obfuscation response, described in greater detail herein, which is then enacted to obfuscate the user's SPI. The resulting obfuscated SPI 1372 is then stored in a repository of obfuscated SPI and SPI policies 1370 for use by risk-adaptive behavior system 118 operations, likewise described in greater detail herein.

In various embodiments, conditional SPI access operations are begun by the risk-adaptive system 118 receiving a request for conditional access to certain obfuscated SPI 1372. Once the conditional SPI access request is received, SPI policies 1374 associated with the requested SPI are retrieved and then used to process the request and determine what authorization is required to access the obfuscated SPI 1372. A determination is then made whether the requestor, such as a security administrator 668, of the conditional access request has the required authorization to access the obfuscated SPI. If not, then a determination is made whether to request additional authorization. For example, manager of the security administrator 668, or other superior, may need to provide authorization to access the obfuscated SPI 1372.

If additional authorization is granted, or if it was determined that the requestor had sufficient authorization to make the request, then the obfuscated SPI 1372 is processed to recover the requested SPI in its original form. In one embodiment, the obfuscated SPI 1372 is recovered in its original form by a conditional SPI access management 1376 system. Once recovered, the SPI is provided in its original form to the requestor, followed by the performance of risk-adaptive behavior operations related to the provision of the recovered SPI. A record of the conditional SPI access request, and the performance of its associated risk-adaptive behavior operations, is then generated.

However, if it was determined that additional authorization was not granted, then risk-adaptive behavior operations to decline the conditional SPI access request are performed, followed by the generation of a record of the conditional SPI access request being declined. The resulting record associated with the conditional SPI access request, and any associated risk-adaptive behavior operations related to the request being declined or granted, is then stored in the repository of obfuscated SPI and SPI policies 1370.

Figure 14A:
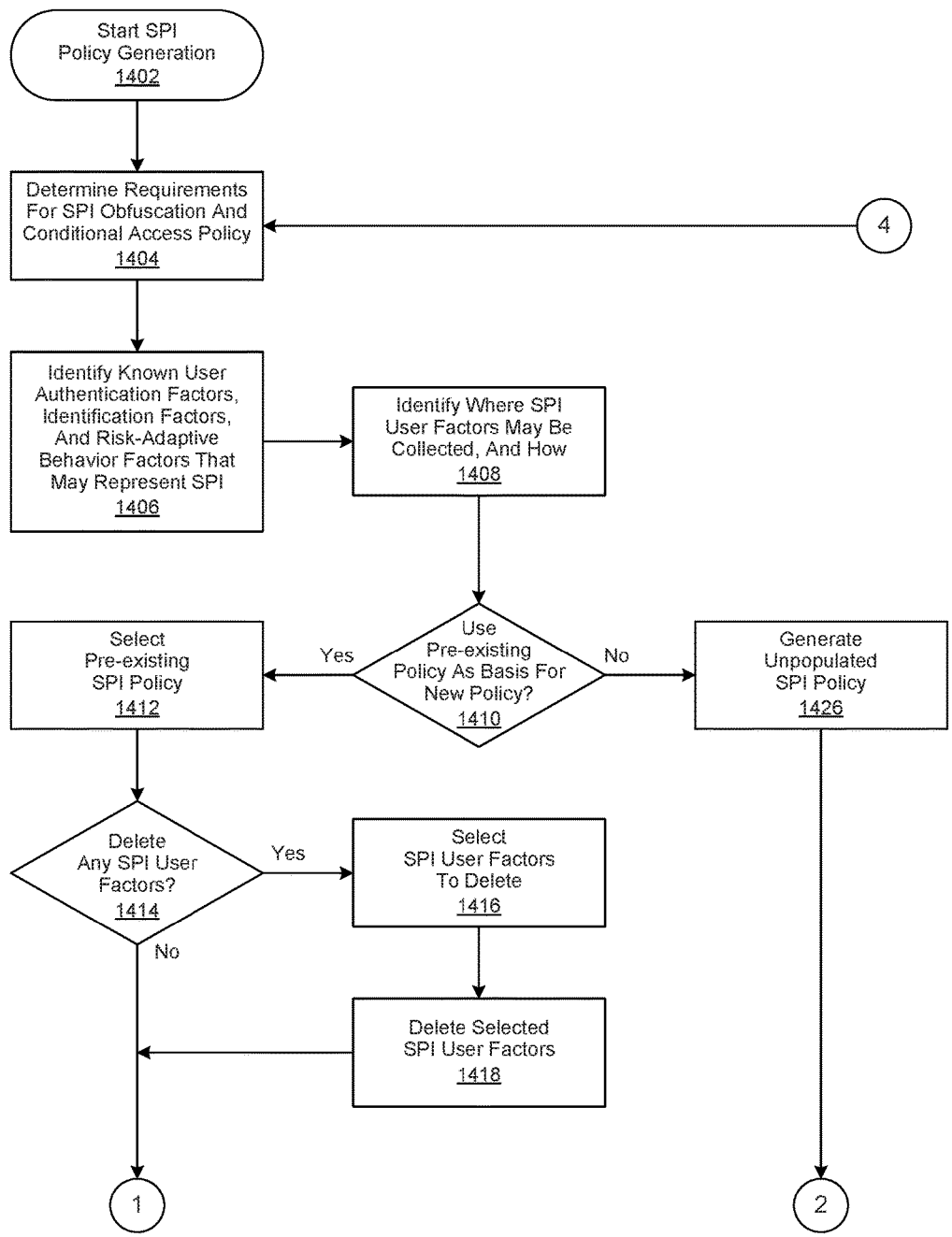
FIGS. 14a through 14c are a generalized flowchart of the performance of risk-adaptive behavior system operations to generate an SPI policy.
Figure 14B:
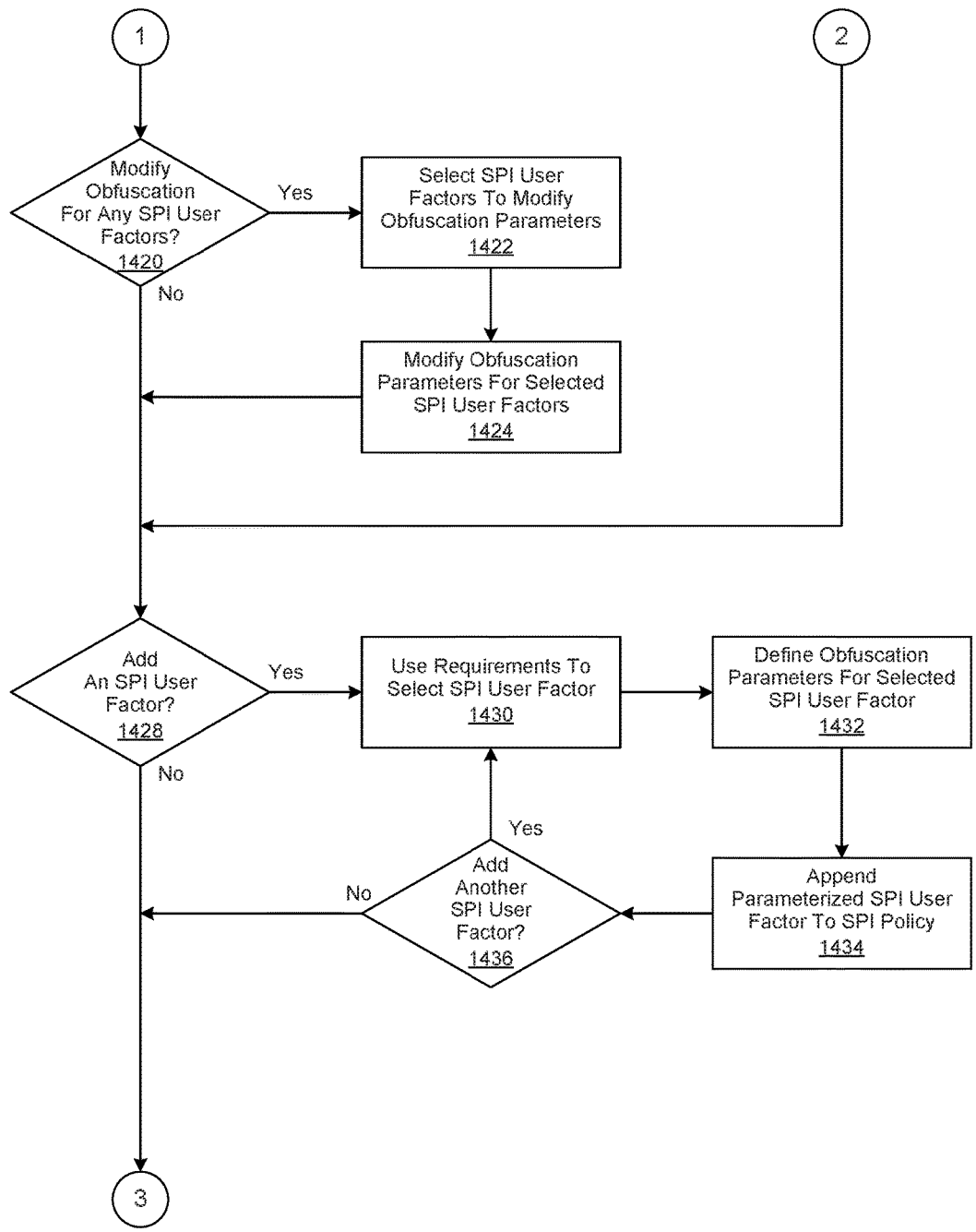
Figure 14C:
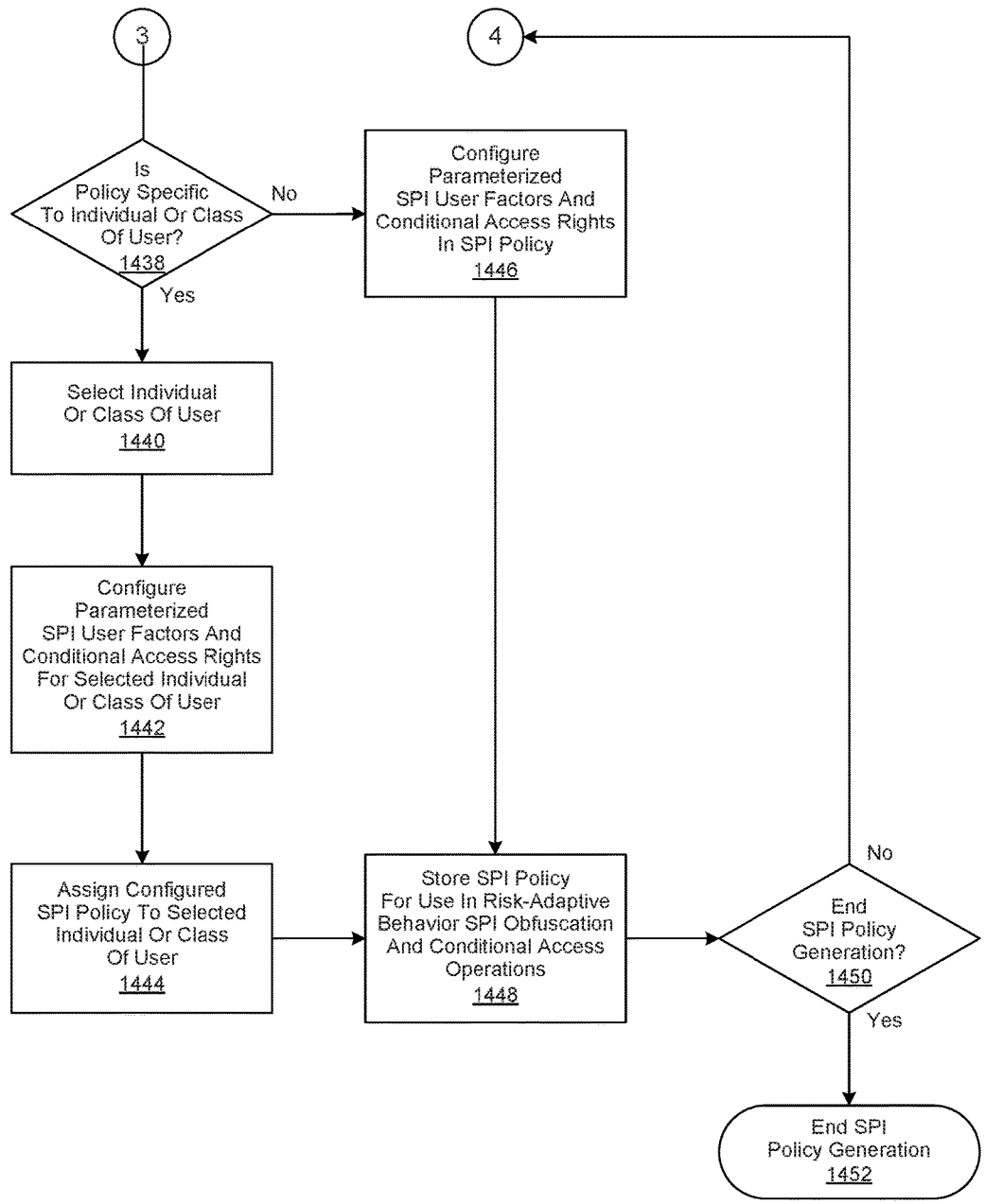

FIGS. 14*a* through 14*c* are a generalized flowchart of the performance of risk-adaptive behavior system operations implemented in accordance with an embodiment of the invention to generate a sensitive personal information (SPI) policy. In this embodiment, SPI obfuscation and conditional access policy ("SPI policy") generation operations are begun in step 1402, followed by determining the requirements for a particular SPI policy in step 1404. Known user authentication factors, identification factors, and risk-adaptive behavior factors, all described in greater detail herein, are identified in step 1406. Where such user factors are collected, and how, likewise described in further detail herein, are then identified in step 1408.

A determination is then made in made in step 1410 whether to use a pre-existing SPI policy as the basis for a new policy. If so, then a pre-existing SPI policy is selected in step 1412, followed by a determination being made in step 1414 whether to delete any SPI user factors it may utilize. If so, then any relevant SPI user factors are selected in step 1416, followed by their deletion in step 1418.

Thereafter, or if it was decided in step 1414 to not delete any SPI user factors associated with the pre-existing SPI policy, then a determination is made in step 1420 whether to modify risk-adaptive behavior obfuscation instructions associated with any SPI user factors it may utilize. If so, then any relevant SPI user factors are selected in step 1422, followed by modification of their associated risk-adaptive behavior obfuscation instructions in step 1424. However, if it was decided in step 1408 to not use a pre-existing SPI policy for a new policy, then an unpopulated SPI is generated in step 1426.

Thereafter, or if it was decided in step 1420 to not modify any obfuscation instructions associated with any SPI user factors, or if they were modified in step 1424, then a determination is made in step 1428 whether to add an SPI user factor to the SPI policy. If so, then the requirements determined in step 1404 are used in step 1430 to select an SPI user factor, followed by defining obfuscation instruction parameters associated with the SPI user factor in step 1432. In various embodiments, the instruction parameters are used by a risk-adaptive behavior system, described in greater detail herein, to obfuscate a user's SPI such that it is communicated in a tokenized or encrypted form. In these embodiments, the instruction parameters, and the method of tokenization or encryption used for obfuscation of the user's SPI, are a matter of design choice.

The parameterized SPI user factor is then appended to the SPI policy in step 1434, followed by a determination being made in step 1436 whether to add another SPI user factor to the SPI behavior policy. If so, then the process is continued, proceeding with step 1430. Otherwise, or if it was decided in step 1428 not to add an SPI user factor to the SPI policy, then a determination is made in step 1438 whether the SPI policy is specific to an individual or class of user. If so, then an individual or class of user is selected in step 1440 and the SPI policy is configured accordingly in step 1442. In certain embodiments, the method by which an individual or class of user is selected, and how the SPI policy may be configured, is a matter of design choice.

The configured SPI policy is then assigned to the selected individual or class of user in step 1444. However, if it was decided in step 1438 that the SPI policy was not specific to an individual or class or user, then the parameterized SPI user factors in the SPI policy are configured in step 1446. Thereafter, or after the SPI behavior policy is assigned to a specific individual or class of user in step 1444, the SPI policy is stored in step 1448 for use in risk-adaptive behavior system operations.

In one embodiment, the SPI policy is stored in a repository of obfuscated SPI and SPI policies. In another embodiment, the repository of obfuscated SPI and SPI policies is implemented for use by a single risk-adaptive behavior monitoring system. In yet another embodiment, the repository of obfuscated SPI and SPI policies is implemented for use by a plurality of risk-adaptive behavior systems. A determination is then made in step 1450 whether to end SPI policy generation operations. If not, the process is continued, proceeding with step 1404. Otherwise, SPI policy generation operations are ended in step 1452.

Figure 15:
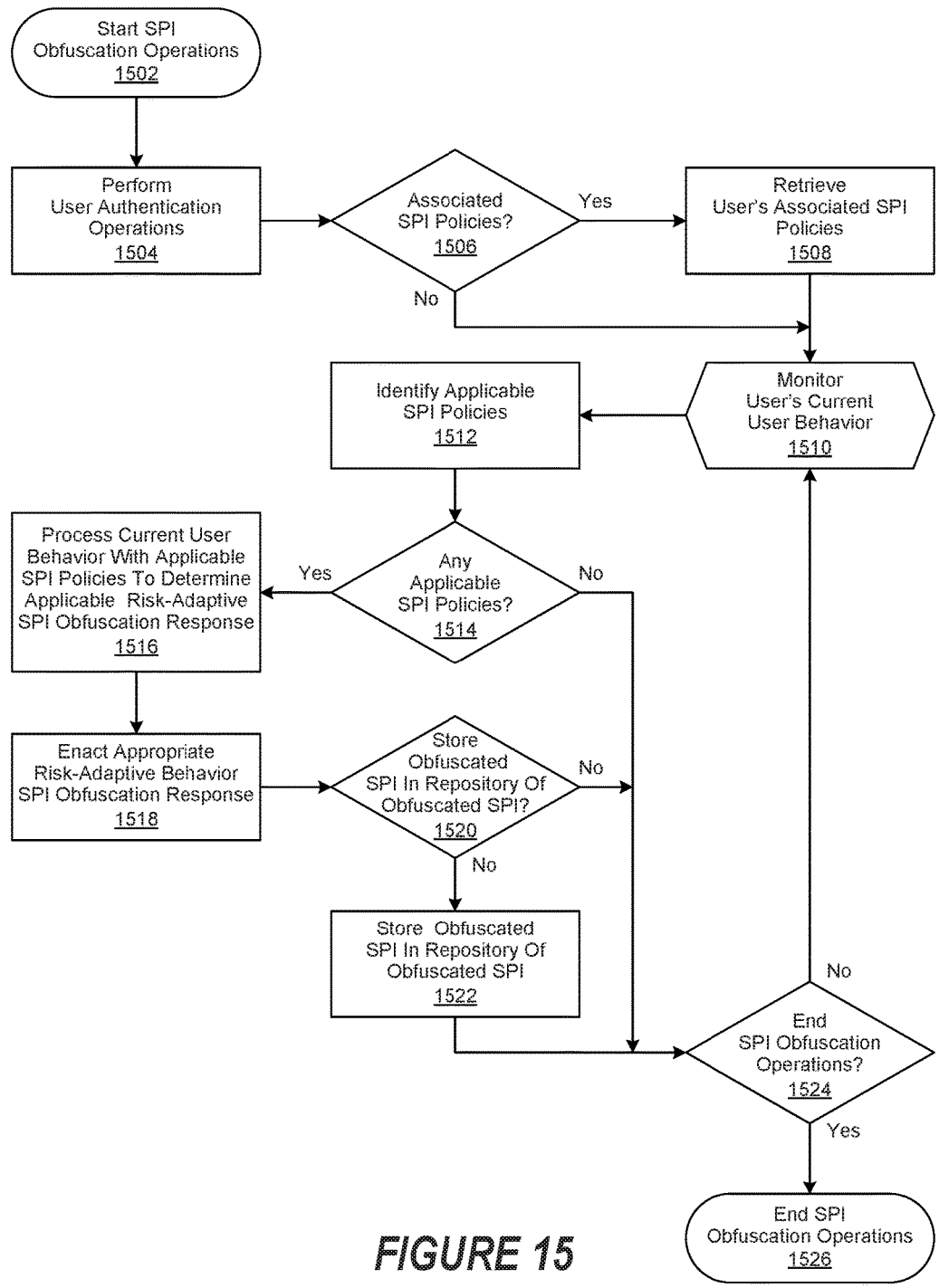
FIG. 15 is a generalized flowchart of the performance of risk-adaptive behavior system operations to obfuscate a user's SPI.

FIG. 15 is a generalized flowchart of the performance of risk-adaptive behavior system operations implemented in accordance with an embodiment of the invention to obfuscate a user's sensitive personal information (SPI). In this embodiment, SPI obfuscation operations are begun in step 1502, followed by the performance of user authentication operations, familiar to those of skill in the art, in step 1504. A determination is then made in step 1506 whether the user has one or more associated SPI policies, described in greater detail herein. If so, then they are retrieved for use in step 1508. Thereafter, or if it was determined in step 1506 the user has no associated SPI policies, then ongoing operations are performed in step 1510 to monitor the user's user behavior.

The user's current user behavior is then processed in step 1512 to identify any applicable SPI policies that may apply. A determination is then made in step 1514 whether any applicable SPI policies have been identified. If not, a determination is made in step 1526 whether to end SPI obfuscation operations. If not, then the process is continued, proceeding with step 1510. Otherwise, SPI obfuscation operations are ended in step 1526.

However, if it is determined in step 1514 that one or more applicable SPI policies have been identified, then they are used in step 1516 to process the user's current user behavior to determine an appropriate risk-adaptive behavior SPI obfuscation response, described in greater detail herein. The appropriate risk-adaptive behavior SPI obfuscation response is then enacted in step 1518 to obfuscate the user's SPI. A determination is then made in step 1520 whether to store the obfuscated SPI in a repository of obfuscated SPI and SPI policies, described in greater detail herein.

If so, then the obfuscated SPI is stored in the repository of obfuscated SPI and SPI policies in step 1522. Thereafter, or if it was respectively determined in steps 1514 and 1520 that there were no applicable SPI policies or not to store the obfuscated SPI in a repository of obfuscated SPI and SPI policies, then a determination is made in step 1524 whether to end SPI obfuscation operations. If not, the process is continued, proceeding with step 1510. Otherwise, SPI obfuscation operations are ended in step 1526.

Figure 16A:
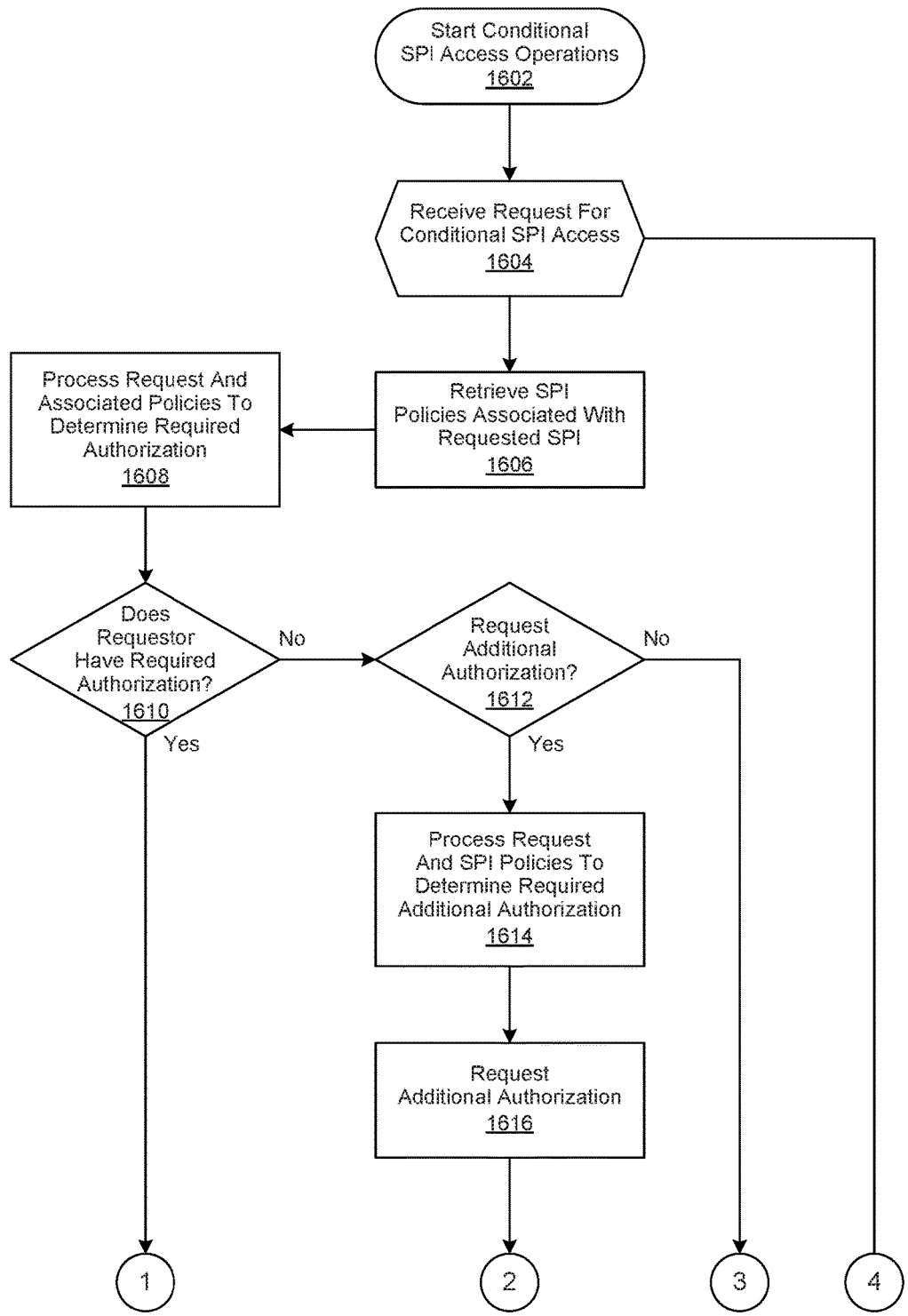
FIGS. 16a through 16b are a generalized flowchart of the performance of risk-adaptive behavior system operations to gain conditional access to a user's SPI.
Figure 16B:
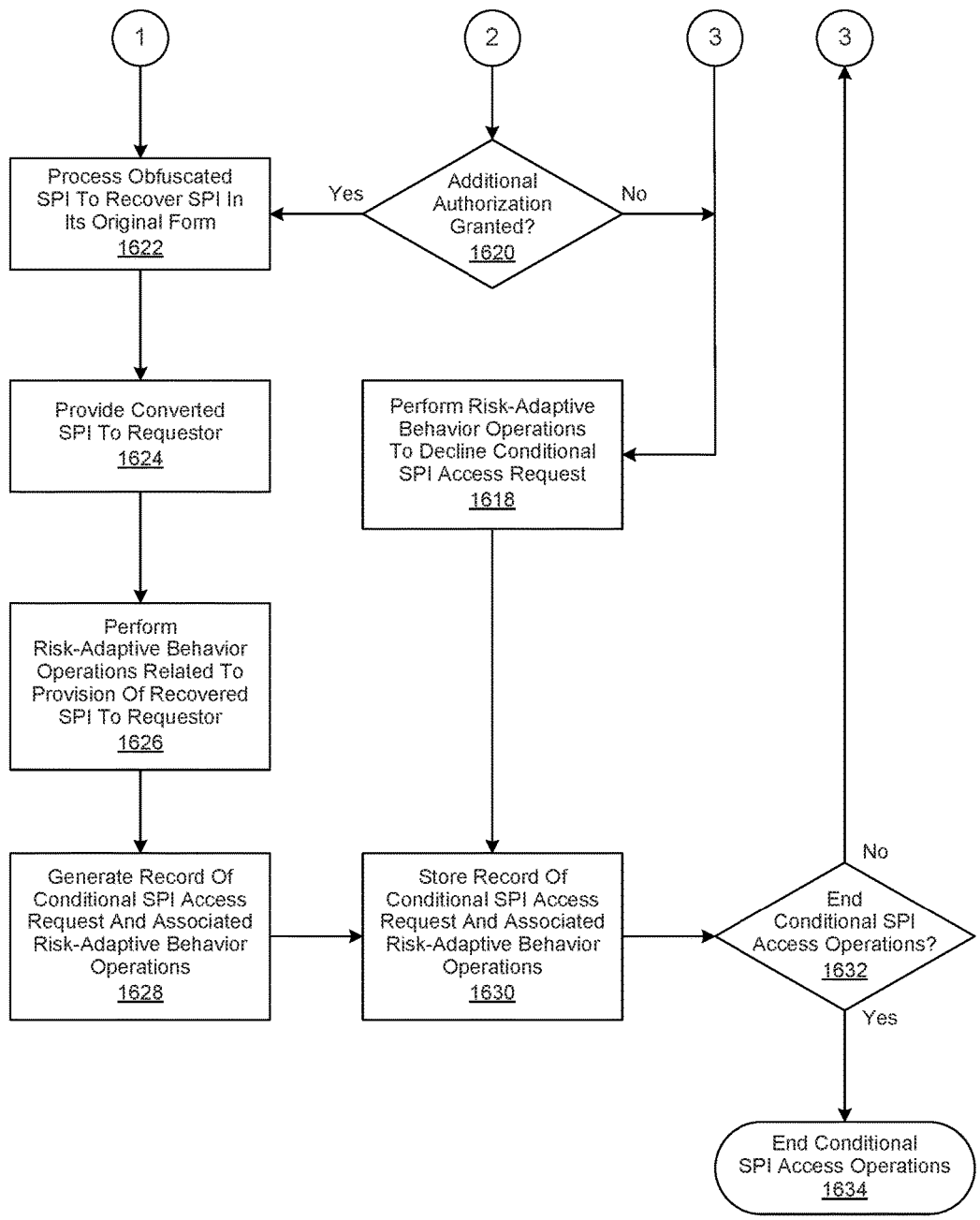

FIGS. 16a through 16b are a generalized flowchart of the performance of risk-adaptive behavior system operations implemented in accordance with an embodiment of the invention to gain conditional access to a user's sensitive personal information (SPI). In this embodiment, conditional SPI access operations are begun in step 1602, followed by ongoing operations being performed in step 1604 to receive a request for conditional access to obfuscated SPI in step 1604. Once a conditional SPI access request is received in step 1604, SPI policies associated with the requested SPI are retrieved in step 1606. The retrieved policies are then used in step 1608 to process the request and determine what authorization is required to access the requested SPI.

A determination is then made in step 1610 whether the requestor of the conditional access request has the required authorization to access the obfuscated SPI. If not, then a determination is made in step 1612 whether to request additional authorization. If so, then the conditional SPI access request and the SPI policies retrieved in step 1606 are processed in step 1614 to determine what additional authorization is required. The additional authorization is then requested in step 1616.

A determination is then made in step 1620 whether additional authorization is granted. If so, or if it was determined in step 1610 that the requestor had sufficient authorization to make the request, then the obfuscated SPI is processed in step 1622 to recover the requested SPI in its original form. The recovered SPI is then provided to the requestor in step 1624, followed by the performance of risk-adaptive behavior operations related to the provision of the recovered SPI in step 1626. A record of the conditional SPI access request, and the performance of its associated risk-adaptive behavior operations, is then generated in step 1628.

However, if it was determined in step 1620 that additional authorization was not granted, then risk-adaptive behavior operations to decline the conditional SPI access request are performed in step 1618. Thereafter, or after a record of the conditional SPI access request, and the performance of its associated risk-adaptive behavior operations is then generated in step 1628, the resulting record associated with the conditional SPI access request, and any associated risk-adaptive behavior operations, is stored in step 1630. A determination is then made in step 1632 whether to continue conditional SPI access operations. If so, then the process is continued, proceeding with step 1604. Otherwise, conditional SPI access operations are ended in step 1634.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a privacy operation, comprising:
monitoring user behavior via an Input/output collector, the Input/output collector capturing user/device interactions between a user and a device;
determining whether the user/device interactions include sensitive personal information;
obfuscating the sensitive personal information, the obfuscating preventing viewing of the sensitive personal information;
presenting the sensitive personal information as a sensitive personal information indication, the sensitive personal information indication indicating the user/device interactions include sensitive personal information;
offering the user an opportunity to enroll user sensitive personal information in a privacy protection system;
enrolling the user sensitive personal information in the privacy protection system, the enrolling preventing display of sensitive personal information to a security administrator via a company security system, the company security system comprising an insider threat monitoring system; and,
presenting a sensitive personal information indication via the company security system, the sensitive personal information indication informing the security administrator that sensitive personal information was entered by the user.

2. The method of claim 1, wherein:
the obfuscating comprises storing the sensitive personal information via a one way function, the one way function preventing access to the sensitive personal information.

3. The method of claim 2, wherein:
the data stream collector comprises a keystroke collector; and,
the monitoring comprises collecting keystrokes resulting from user/device interactions, the keystrokes corresponding to the sensitive personal information being added to the one way function.

4. The method of claim 1, further comprising:
capturing a context associated with the data streams resulting from user/device interactions between a user and a corresponding endpoint device; and,
presenting the context along with the sensitive personal information token.

5. The method of claim 1, further comprising:
developing sensitive personal information obfuscation policies; and,
using the sensitive personal information obfuscation policies to determine whether the user/device interactions include sensitive personal information and which sensitive personal information to obfuscate.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
monitoring user behavior via an Input/output collector, the Input/output collector capturing user/device interactions between a user and a device;
determining whether the user/device interactions include sensitive personal information;
obfuscating the sensitive personal information, the obfuscating preventing viewing of the sensitive personal information;
presenting the sensitive personal information as a sensitive personal information indication, the sensitive personal information indication indicating the user/device interactions include sensitive personal information;
offering the user an opportunity to enroll user sensitive personal information in a privacy protection system;
enrolling the user sensitive personal information in the privacy protection system, the enrolling preventing display of sensitive personal information to a security administrator via a company security system, the company security system comprising an insider threat monitoring system; and, presenting a sensitive personal information indication via the company security system, the sensitive personal information indication informing the security administrator that sensitive personal information was entered by the user.

7. The system of claim 6, wherein:

the obfuscating comprises storing the sensitive personal information via a one way function, the one way function preventing access to the sensitive personal information.

8. The system of claim 7, wherein:

the data stream collector comprises a keystroke collector; and, the monitoring comprises collecting keystrokes resulting from user/device interactions, the keystrokes corresponding to the sensitive personal information being added to the one way function.

9. The system of claim 6, wherein:

capturing a context associated with the data streams resulting from user/device interactions between a user and a corresponding endpoint device; and, presenting the context along with the sensitive personal information token.

10. The system of claim 6, wherein the instructions executable by the processor are further configured for:

developing sensitive personal information obfuscation policies; and, using the sensitive personal information obfuscation policies to determine whether the data streams resulting from user/device interactions include sensitive personal information and which sensitive personal information to obfuscate.

11. A non-transitory, computer-readable storage medium embodying computer program code, the computer program code comprising computer executable instructions configured for:

monitoring user behavior via an Input/output collector, the Input/output collector capturing user/device interactions between a user and a device;

determining whether the data streams resulting from user/device interactions include sensitive personal information;

obfuscating the sensitive personal information, the obfuscating preventing viewing of the sensitive personal information;

presenting the sensitive personal information as a sensitive personal information indication, the sensitive personal information indication indicating the user/device interactions include sensitive personal information;

offering the user an opportunity to enroll user sensitive personal information in a privacy protection system;

enrolling the user sensitive personal information in the privacy protection system, the enrolling preventing display of sensitive personal information to a security administrator via a company security system, the company security system comprising an insider threat monitoring system; and, presenting a sensitive personal information indication via the company security system, the sensitive personal information indication informing the security administrator that sensitive personal information was entered by the user.

12. The non-transitory, computer-readable storage medium of claim 11, wherein:

the obfuscating comprises storing the sensitive personal information via a one way function, the one way function preventing access to the sensitive personal information.

13. The non-transitory, computer-readable storage medium of claim 12, wherein:

the data stream collector comprises a keystroke collector; and, the monitoring comprises collecting keystrokes resulting from user/device interactions, the keystrokes corresponding to the sensitive personal information being added to the one way function.

14. The non-transitory, computer-readable storage medium of claim 11, wherein the computer executable instructions are further configured for:

capturing a context associated with the data streams resulting from user/device interactions between a user and a corresponding endpoint device; and, presenting the context along with the sensitive personal information token.

15. The non-transitory, computer-readable storage medium of claim 11, wherein:

developing sensitive personal information obfuscation policies; and, using the sensitive personal information obfuscation policies to determine whether the user/device interactions include sensitive personal information and which sensitive personal information to obfuscate.

16. The non-transitory, computer-readable storage medium of claim 11, wherein the computer executable instructions are deployable to a client system from a server system at a remote location.

17. The non-transitory, computer-readable storage medium of claim 11, wherein the computer executable instructions are provided by a service provider to a user on an on-demand basis.

* * * * *